United States Patent
Kobatake et al.

(10) Patent No.: US 10,225,128 B2
(45) Date of Patent: Mar. 5, 2019

(54) DIVIDED DATA TRANSMITTING AND RECEIVING SYSTEM

(71) Applicant: SOCIONEXT INC., Kanagawa (JP)

(72) Inventors: Hisateru Kobatake, Takatsuki (JP); Teruaki Hasegawa, Takatsuki (JP)

(73) Assignee: SOCIONEXT INC., Kanagawa (JP)

(*) Notice: Subject to any disclaimer, the term of this patent is extended or adjusted under 35 U.S.C. 154(b) by 0 days.

(21) Appl. No.: 15/646,849

(22) Filed: Jul. 11, 2017

(65) Prior Publication Data

US 2017/0310530 A1    Oct. 26, 2017

Related U.S. Application Data

(63) Continuation of application No. PCT/JP2016/000023, filed on Jan. 5, 2016.

(30) Foreign Application Priority Data

Jan. 22, 2015 (JP) .................... 2015-009984

(51) Int. Cl.
*H03D 1/00* (2006.01)
*H04L 27/06* (2006.01)
(Continued)

(52) U.S. Cl.
CPC ........ *H04L 27/3836* (2013.01); *H04L 5/0044* (2013.01); *H04L 25/14* (2013.01);
(Continued)

(58) Field of Classification Search
CPC . H04L 27/3836; H04L 5/0044; H04L 27/362; H04L 69/08; H04L 49/9057
(Continued)

(56) References Cited

U.S. PATENT DOCUMENTS

2014/0211812 A1    7/2014 Jung et al.
2016/0142343 A1*   5/2016 Tongle ............... H04L 49/9057
                                                         370/474

FOREIGN PATENT DOCUMENTS

JP    2005-167890 A    6/2005
JP    2012-209675 A    10/2012
(Continued)

OTHER PUBLICATIONS

MIC: Information and Communications Council/Information and Communications Technology Subcommittee/Broadcasting System Commission Report (Draft), Chapter 6: Technical Pre-Requisites for Multiple Carrier Transmission (ITU-T J.183), Jul. 11, 2014, p. 63-92); with partial English translation.
(Continued)

*Primary Examiner* — Phuong Phu
(74) *Attorney, Agent, or Firm* — McDermott Will & Emery LLP

(57) ABSTRACT

A receiving system of the present disclosure includes: a plurality of demodulators; an add-on generating one stream based on an output from each of the demodulators; a selector selecting and outputting one among an output from one of the demodulators, namely the demodulator, and the one stream from the add-on; and a back-end processor generating an output for a display based on an output from the selector and the other demodulators, namely the demodulators. The selector selects an output from the demodulator in a single channel transmission mode, and selects the stream from the add-on in a multiple channel transmission mode.

14 Claims, 39 Drawing Sheets

(51) Int. Cl.
| | | |
|---|---|---|
| *H04L 27/38* | (2006.01) | |
| *H04L 5/00* | (2006.01) | |
| *H04L 27/36* | (2006.01) | |
| *H04L 29/06* | (2006.01) | |
| *H04L 25/14* | (2006.01) | |
| *H04N 21/238* | (2011.01) | |
| *H04N 21/438* | (2011.01) | |
| *H04L 27/00* | (2006.01) | |

(52) U.S. Cl.
CPC ............ *H04L 27/362* (2013.01); *H04L 69/08* (2013.01); *H04L 27/0008* (2013.01); *H04L 27/3818* (2013.01); *H04N 21/238* (2013.01); *H04N 21/438* (2013.01)

(58) Field of Classification Search
USPC ........................................ 375/342, 340, 316
See application file for complete search history.

(56) References Cited

FOREIGN PATENT DOCUMENTS

| | | |
|---|---|---|
| JP | 2013-175949 A | 9/2013 |
| JP | 2015-012421 A | 1/2015 |

OTHER PUBLICATIONS

International Search Report issued in International Patent Application No. PCT/JP2016/000023, dated Mar. 29, 2016; with English translation.

* cited by examiner

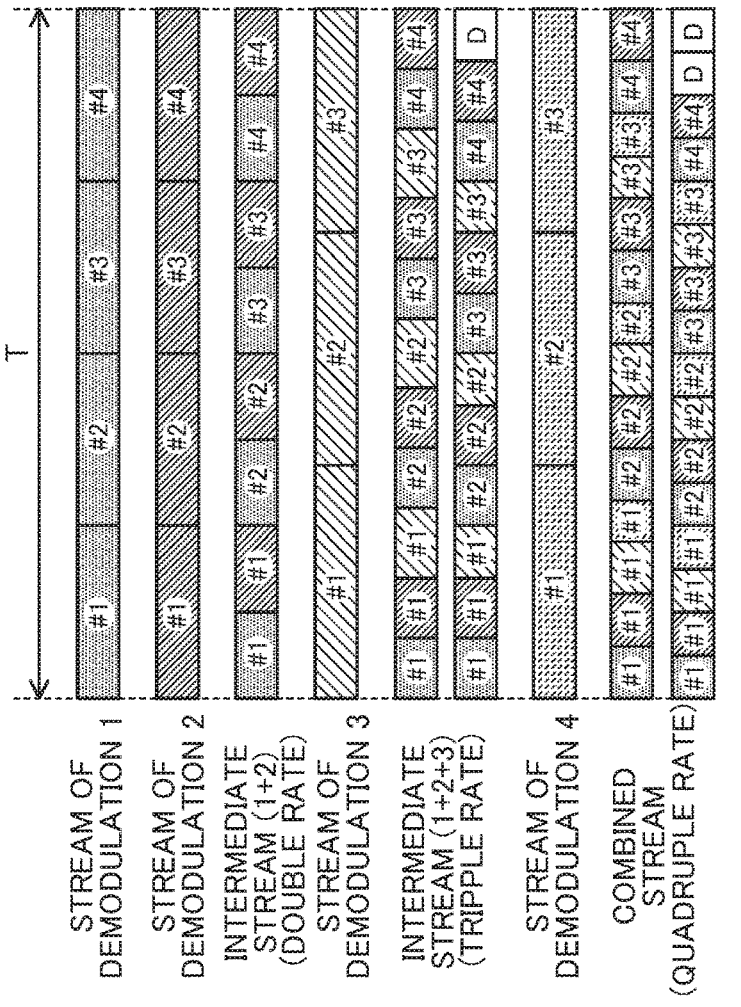
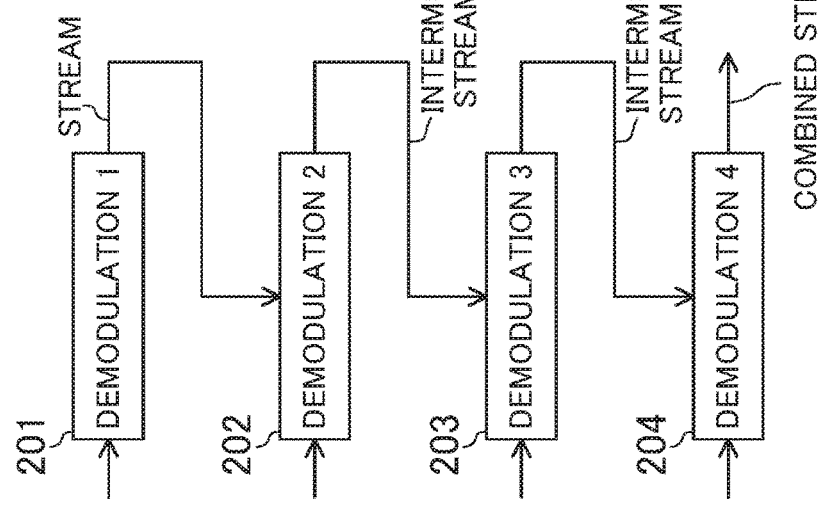
FIG. 21A
FIG. 21B

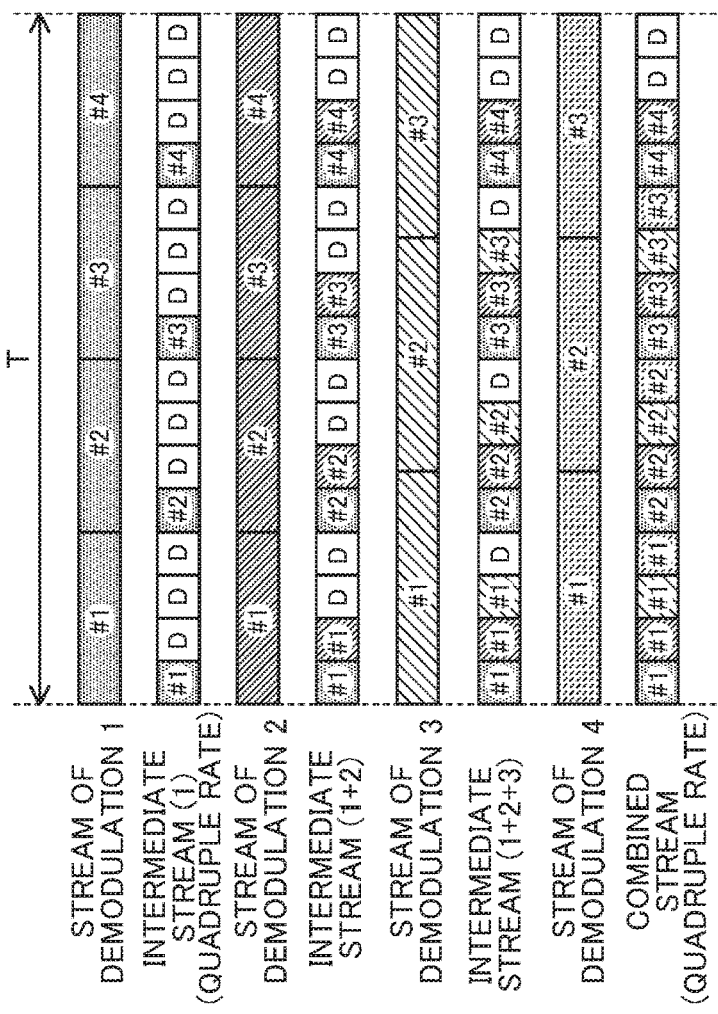
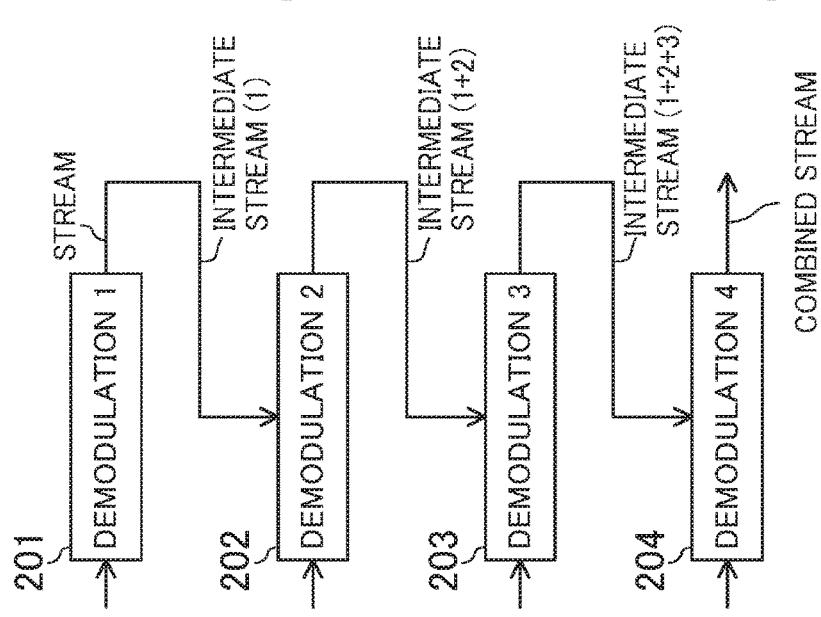
FIG. 22A
FIG. 22B

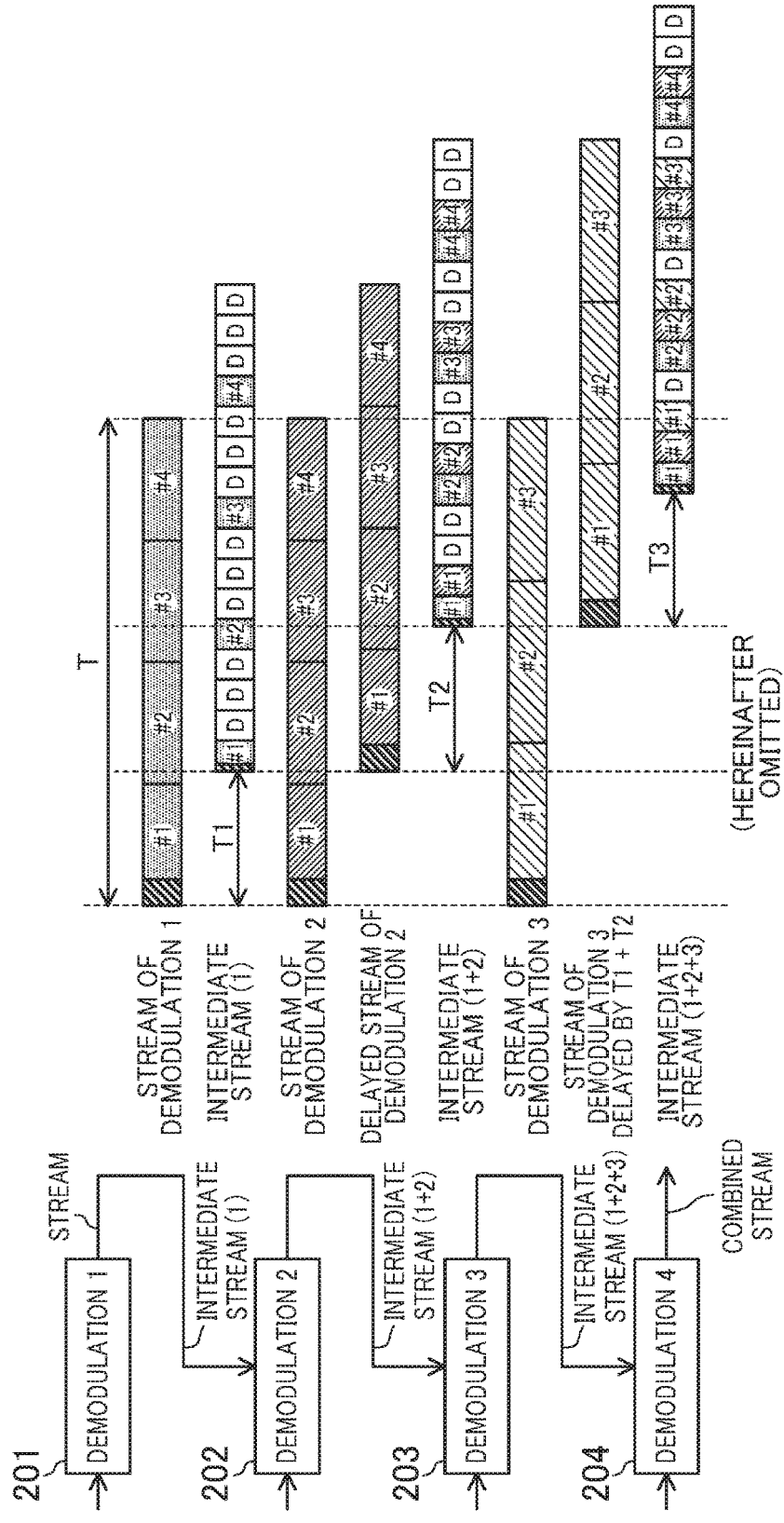

FIG. 34

| CH1 | SLOT #X-1 | SLOT #X | SLOT #X+1 | SLOT #X+2 |
|---|---|---|---|---|
| | PID=0x0001<br>CC=0x2 | PID=0x0001<br>CC=0x5 | PID=0x0002<br>CC=0x2 | PID=0x0001<br>CC=0xB |

| CH2 | SLOT #Y-1 | SLOT #Y | SLOT #Y+1 | SLOT #Y+2 |
|---|---|---|---|---|
| | PID=0x0002<br>CC=0x1 | PID=0x0001<br>CC=0x7 | PID=0x0002<br>CC=0x3 | PID=0x0001<br>CC=0xC |

| CH3 | SLOT #Z-1 | SLOT #Z | SLOT #Z+1 | SLOT #Z+2 |
|---|---|---|---|---|
| | PID=0x0001<br>CC=0x1 | PID=0x0001<br>CC=0x4 | PID=0x0001<br>CC=0x8 | PID=0x0001<br>CC=0xA |

| CH4 | SLOT #W-1 | SLOT #W | SLOT #W+1 | SLOT #W+2 |
|---|---|---|---|---|
| | PID=0x0001<br>CC=0x3 | PID=0x0001<br>CC=0x6 | PID=0x0001<br>CC=0x9 | PID=0x0002<br>CC=0x3 |

DIVIDED DATA TRANSMITTING AND RECEIVING SYSTEM

CROSS-REFERENCE TO RELATED APPLICATION

This is a continuation of International Application No. PCT/JP2016/000023 filed on Jan. 5, 2016, which claims priority to Japanese Patent Application No. 2015-009984 filed on Jan. 22, 2015. The entire disclosures of these applications are incorporated by reference herein.

BACKGROUND

The present disclosure relates to a transmitting and receiving system for divided data.

Divided transmission using multiple carriers (hereinafter "multiple carrier transmission system") in which a TS (transport stream) that has a capacity exceeding a transmission capacity of a carrier and thus cannot be transmitted in transmission with a single carrier (hereinafter "single carrier transmission") is divided and multiplexed into frames, and in which data are transmitted using a plurality of carriers is known in the art (see Japanese Unexamined Patent Publication No. 2012-209675; MIC: Information and Communications Council/Information and Communications Technology Subcommittee/Broadcasting System Commission Report (Draft), Chapter 6: Technical Pre-Requisites for Multiple Carrier Transmission (ITU-T J.183), Nov. 7, 2014, p. 63-92).

Further, a technique for efficient simultaneous transmission of a TS packet and a VL (variable-length) packet is known in the art (see Japanese Unexamined Patent Publication No. 2013-175949).

SUMMARY

The present disclosure provides a receiving system performing multiple carrier transmission by adding an add-on serving as a combiner to an existing receiving system which receives a plurality of carriers.

Further, the present disclosure provides a receiving system performing multiple carrier transmission by sequential combination in a plurality of demodulators.

Moreover, the present disclosure provides a transmitting system and a receiving system performing multiple carrier transmission which can reliably absorb a TDOA (time difference of arrival) of a plurality of channels.

Furthermore, the present disclosure provides a data allocation method and a data acquisition method which can reliably convert a VL packet into a transmission packet of a fixed length.

A receiving system according to the present disclosure for example receives a plurality of carriers and generates one or a plurality of streams, the system including: a first demodulator receiving and processing a first transmission signal; a second demodulator receiving and processing a second transmission signal different from the first transmission signal; a combiner generating one stream based on at least an output from the first demodulator and an output from the second demodulator; a selector receiving an output from the first demodulator and the one stream from the combiner as inputs, and selecting and outputting one among the output from the first demodulator and the one stream from the combiner; and a back-end processor receiving an output from the selector and the output from the second demodulator as inputs, and generating an output for a display, the selector selecting the output from the first demodulator in a receiving mode in single channel transmission, and selecting the one stream in a receiving mode in multiple channel transmission.

Moreover, a receiving system according to the present disclosure may for example receive multiple carriers and generate one or a plurality of streams, the system including: a first demodulator having a first memory which receives and processes a first transmission signal; a second demodulator having a second memory which receives and processes a second transmission signal different from the first transmission signal; one or more additional demodulators; and a back-end processor generating an output for a display, wherein the demodulators including the first demodulator and the second demodulator are all serially connected, the demodulators are categorized into a front demodulator which receives data from a first carrier and which does not input data demodulated in the other demodulators, a back demodulator which receives data from a second carrier, and which at least partly outputs demodulation results to the back-end processor, and intermediate demodulators which do not include the front demodulator and the back demodulator, and the front demodulator outputs an output to one demodulator among the intermediate demodulators, and each of the intermediate demodulators outputs both, demodulation results of data of a carrier corresponding to the respective demodulator and an output from a previous demodulator, as a part of a stream to a subsequent demodulator.

A transmitting system according to the present disclosure may for example divide one input signal and output a plurality of transmission signals, the system including: a divider which divides one input signal into a plurality of signals and outputs these signals; an identification data adder which adds identification data to a predetermined group of divided signals among signals divided by the divider; a first modulator which processes a first divided signal to which identification data have been added, and outputs a first transmission signal; and a second modulator which processes a second divided signal to which identification data have been added, and outputs a second transmission signal.

A receiving system according to the present disclosure may, corresponding to the transmitting system, for example receive a plurality of carriers, and generate one stream, the receiving system including: a first demodulator receiving and processing a first transmission signal; a second demodulator receiving and processing a second transmission signal different from the first transmission signal; an identification data detector receiving an output from the first demodulator and an output from the second demodulator as inputs, and identifying predetermined identification data which are included in the output from the first demodulator and the output from the second demodulator; and a delay correction signal generator which, based on identification results obtained from the identification data detector, uses a predetermined processing to determine a subject for adjusting a time difference between an output from the first demodulator and an output from the second demodulator.

A data allocation method according to the present disclosure may include, for example: dividing data of a VL packet; inserting, into a transmission packet 1 of a fixed length, beginning position information indicating a start position of a VL packet 2 which is allocated next in a case where, in allocating into a transmission packet of a fixed length, allocation of a VL packet 1 has been finished somewhere along the transmission packet 1; and subsequently allocating the VL packet 2, wherein instead of the beginning position information 1, invalid data are allocated to the transmission packet 1 in a case where allocation of the VL packet 2 to the transmission packet 1 is not performed if, after allocation of the VL packet 1 has been finished somewhere along the transmission packet 1, beginning position information 1 indicating a start position of the VL packet 2 which is allocated next is inserted.

Further, a data acquisition method according to the present disclosure may be, for example, a data acquisition method for acquisition of a VL packet allocated to a transmission packet of a fixed length corresponding to the data allocation method, processing being performed interpreting that, in a case where acquisition of data forming a VL packet 1 has been finished within a transmission packet 1 of a fixed length, and where no beginning position information indicating a start position of a following VL packet 2 has been inserted into the transmission packet 1 of the fixed length, aside from data forming the VL packet 1, invalid data are included in the transmission packet 1 of the fixed length.

According to the present disclosure, a receiving system for multiple carrier transmission can be provided by adding an add-on serving as a combiner to an existing receiving system which receives a plurality of carriers.

Further, according to the present disclosure, a receiving system for multiple carrier transmission can be provided by running a sequential combination in a plurality of demodulators.

Moreover, according to the present disclosure, a transmitting system and a receiving system for multiple carrier transmission which can reliably absorb a TDOA of a plurality of channels can be provided.

Furthermore, according to the present disclosure, a data allocation method and a data acquisition method which allow for reliably converting a VL packet into a transmission packet of a fixed length can be provided.

BRIEF DESCRIPTION OF THE DRAWINGS

FIG. 21A is a block diagram showing a variation of the receiving system shown in FIG. 20, and FIG. 21B is a timing diagram for explaining how the variation of the receiving system shown in FIG. 21A operates.

FIG. 22A is a block diagram showing another variation of the receiving system shown in FIG. 20, and FIG. 22B is a timing diagram for explaining how this variation of the receiving system shown in FIG. 22A operates.

FIG. 25A is a block diagram showing yet still another variation of the receiving system shown in FIG. 20, and FIG. 25B is a timing diagram for explaining how this variation of the receiving system shown in FIG. 25A operates.

FIG. 34 is a timing diagram for explaining how the receiving system shown in FIG. 1 operates.

DETAILED DESCRIPTION

Embodiments of the present disclosure are described below with reference to the drawings.

Figure 1:
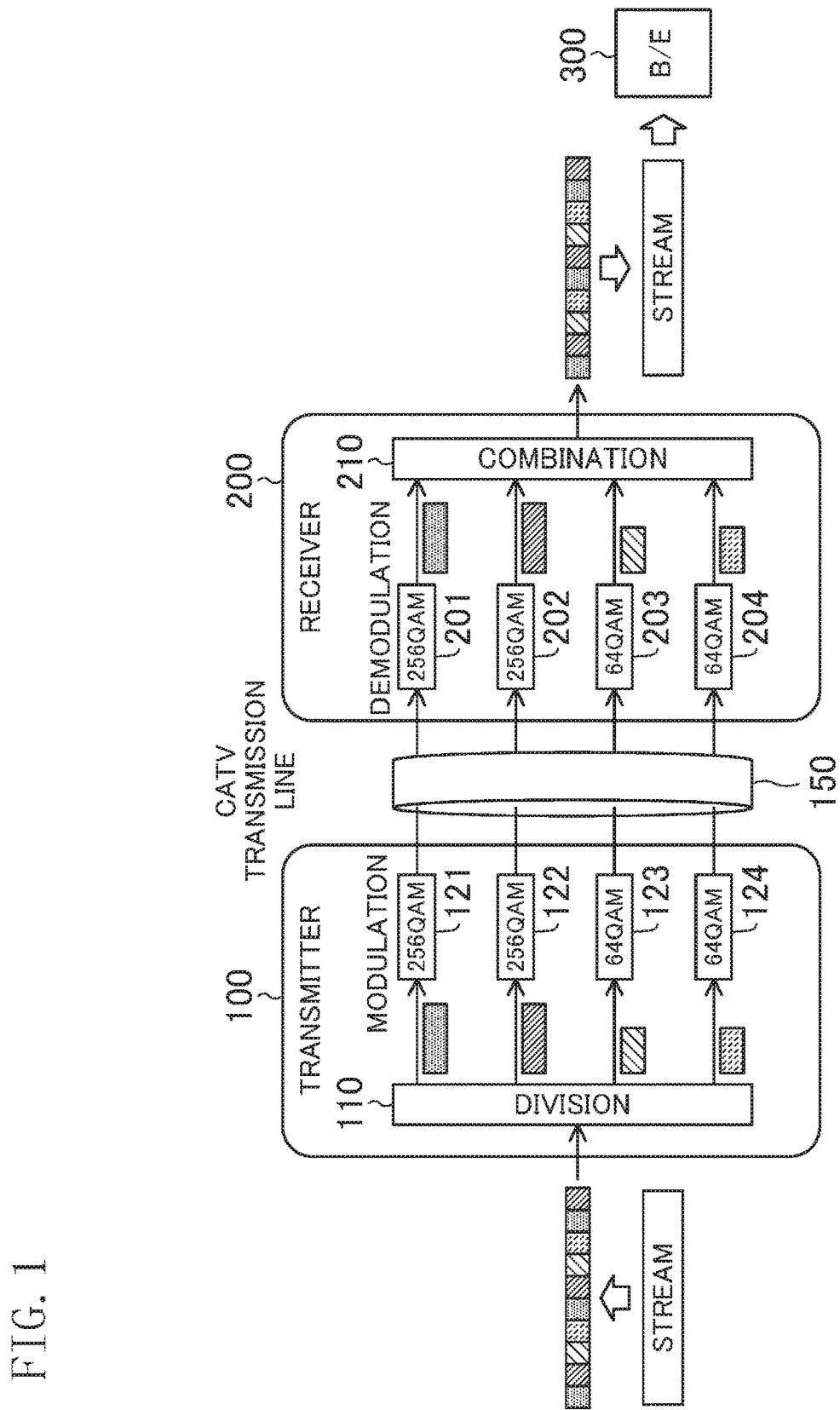
FIG. 1 is a block diagram showing a configuration of a transmitting and receiving system according to the present disclosure.

FIG. 1 is a block diagram showing a configuration of a transmitting and receiving system according to the present disclosure. The transmitting and receiving system shown in FIG. 1 is a transmitting and receiving system capable of multiple carrier transmission and used for transmission of video and audio data in CATV. The transmitting and receiving system includes a transmitter 100, a CATV transmission line 150, a receiver 200, and a back-end processor 300.

The transmitter 100 includes a divider 110 and modulators 121, 122, 123, and 124 and divides one input signal and outputs a plurality of transmission signals. The divider 110 divides one input signal (a stream exceeding a transmission capacity of one capacity) into a plurality of signals and outputs these signals. In the modulators 121 to 124, either 256-QAM (256-ary Quadrature Amplitude Modulation) or 64-QAM (64-ary Quadrature Amplitude Modulation) is employed in modulation, respectively.

The receiver 200 includes demodulators 201, 202, 203, and 204, and a combiner 210. Each of the demodulators 201 to 204 demodulate a signal received via a CATV transmission line 150 by demodulation corresponding to the modulation performed by the modulators 121 to 124. The combiner 210 generates one stream based on each output from the demodulators 201 to 204. The back-end processor 300 receives an output from the combiner 210 as an input, and generates an output for a display (not shown). The receiver 200 and the back-end processor 300 act as a receiving system which receives a plurality of carriers and generates one stream.

In the receiver 200 the following processing is necessary in multiple carrier transmission: (1) acquiring header information by detecting a header; (2) absorbing a TDOA between each of channels; (3) adjusting a data rate between each of the channels by inserting a dummy slot; and (4) combining a data sequence by parallel/serial conversion.

Figure 2:
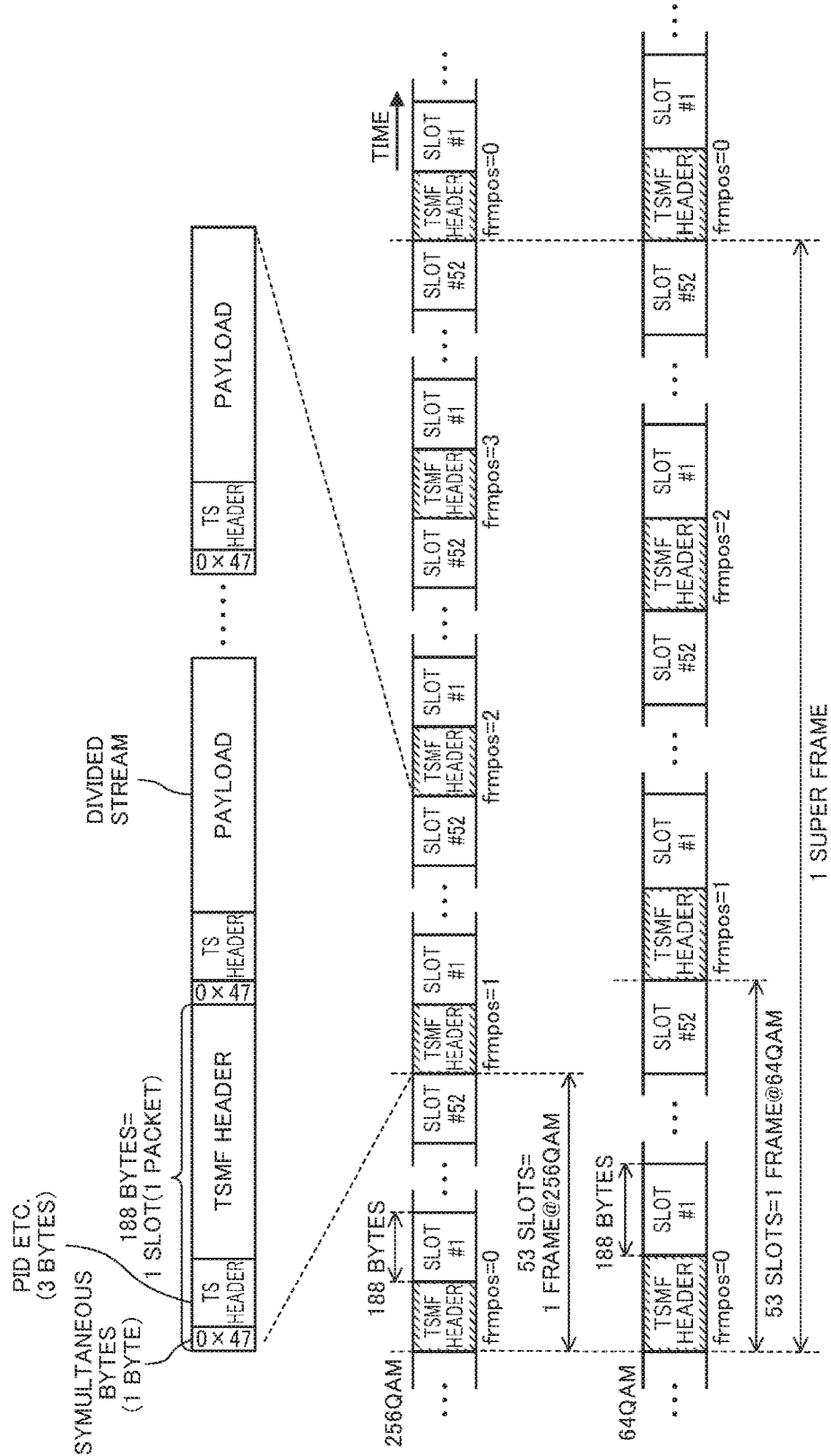
FIG. 2 is a timing diagram showing an example data configuration in the transmitting and receiving system shown in FIG. 1.

FIG. 2 is a timing diagram showing an example data configuration in the transmitting and receiving system shown in FIG. 1. In the example shown in FIG. 2, one slot (one packet) is 188 bytes long. The first byte of a slot is a synchronization byte of a fixed value (0x47), the following three bytes are TS header bytes including a PID (packet identifier). Moreover, one frame is composed of 53 slots, and the first slot is a TSMF (transport stream multiplexing frame) header (see Japanese Unexamined Patent Publication No. 2012-209675). In the multiple carrier transmission system (extended TSMF), in 256-QAM one super frame consists of four frames, and in 64-QAM one super frame consists of three frames.

First Embodiment

Figure 3:
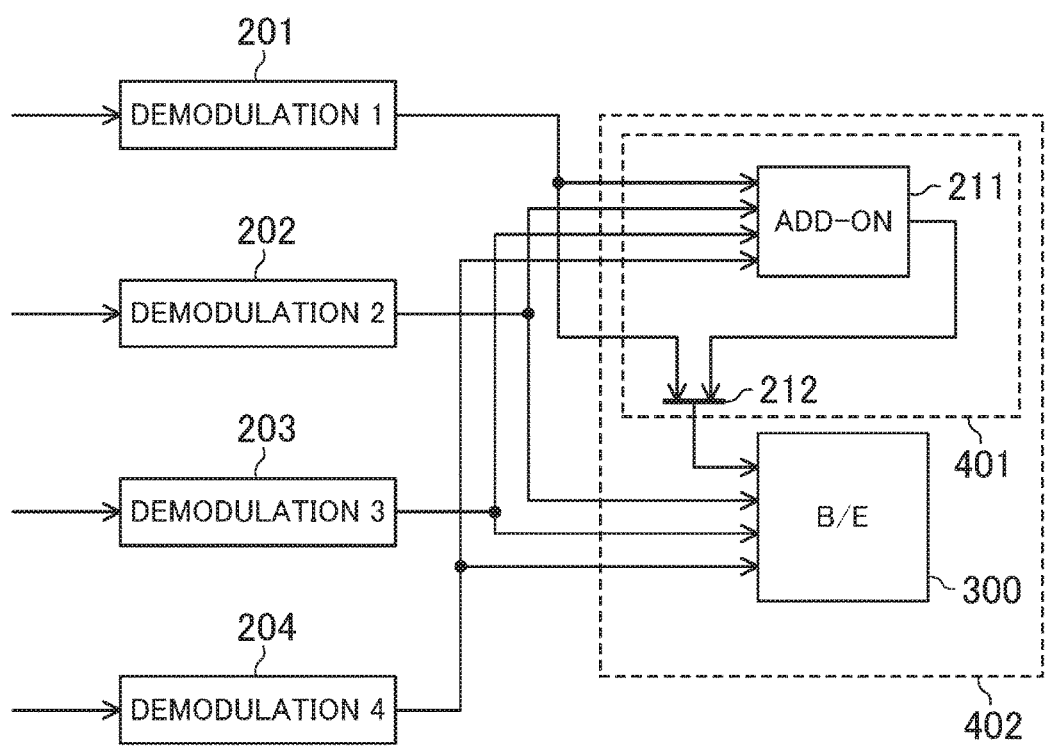
FIG. 3 is a block diagram showing a configuration of a receiving system according to a first embodiment.

FIG. 3 is a block diagram showing a configuration of a receiving system according to a first embodiment. The receiving system shown in FIG. 3 is a combination of an existing receiving system including a function for simultaneous processing of a plurality of channels (e.g., a simultaneous recording function), and having an add-on 211 added to the existing receiving system. The receiving system includes the demodulators 201 to 204, the add-on 211, a selector 212, and the back-end processor 300. The add-on 211 serves as the combiner 210 described above, and generates one stream based on an output from the demodulators 201 to 204. The selector 212 selects and outputs one among an output from the demodulator 201 and the one stream from the add-on 211. In doing so, the selector 212 selects the output from the demodulator 201 in a receiving mode in single channel transmission, and selects the one stream from the add-on 211 in a receiving mode in multiple channel transmission. The back-end processor 300 receives an output from the selector 212 and outputs from the demodulators 202 to 204 as inputs, and generates an output for a display.

In the receiving mode in single channel transmission, the back-end processor 300 processes the output from the selector 212 and the outputs from the demodulators 202 to 204 separately. In the receiving mode in multiple channel transmission, the back-end processor 300 processes the output from the selector 212 and does not process the outputs from the demodulators 202 to 204. The back-end processor 300 can determine whether the receiving mode in single channel transmission or the receiving mode in multiple channel transmission is selected. Depending on specifications of a channel viewed or listened, the back-end processor 300 may for example select the receiving mode in multiple channel transmission when a channel which employs multiple carrier transmission has been selected.

In the configuration shown in FIG. 3, the add-on 211 which performs data combination is added to an existing system. A receiving system for multiple carrier transmission can be provided by switching between, and inputting, one conventional stream input by the back-end processor 300 and a combined stream.

Note that the demodulators 201 to 204, the add-on 211, the selector 212, and the back-end processor 300 are implemented with one LSI (large scale integrated circuit). Alternatively, only the add-on 211 and the selector 212 may be implemented with one LSI 401. As a further alternative, the add-on 211, the selector 212, and the back-end processor 300 may be implemented with one LSI 402.

Figure 4:
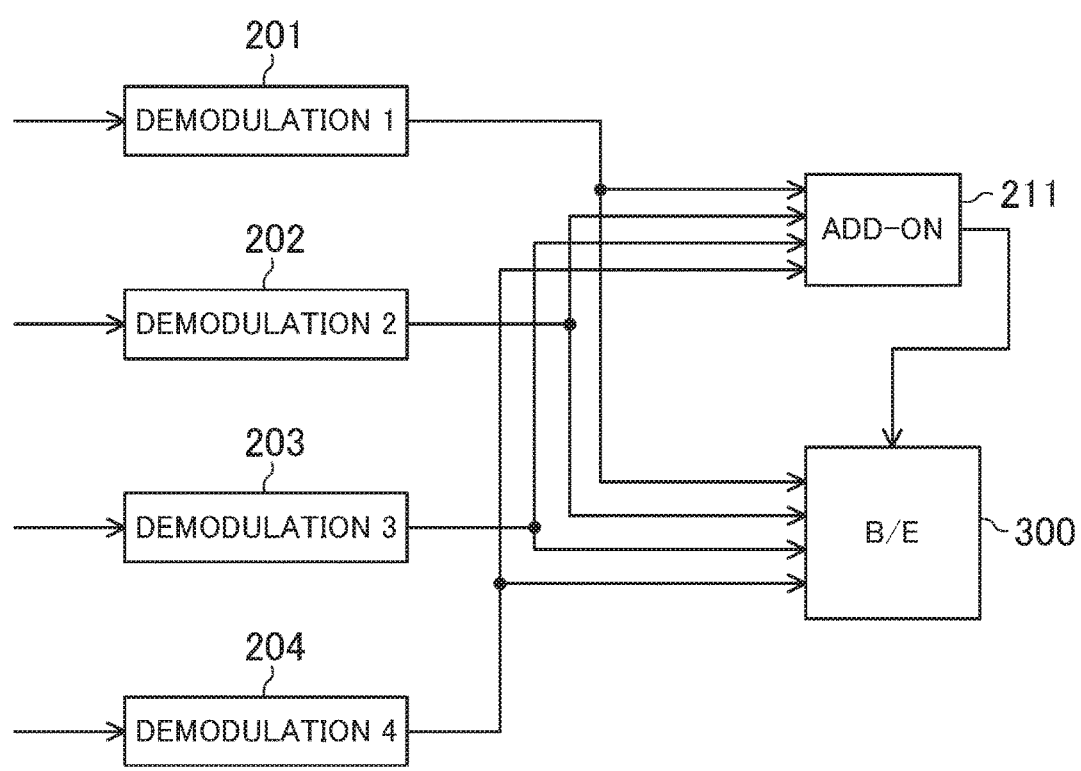
FIG. 4 is a block diagram showing a variation of the receiving system shown in FIG. 3.

FIG. 4 is a block diagram showing a variation of the receiving system shown in FIG. 3. In the receiving system shown in FIG. 4 output timing of the demodulators 201 to 204 is adjusted by using a memory included in the demodulators 201 to 204 to absorb a TDOA and to insert a dummy slot. In the add-on 211 which has been added to serve as the combiner 210, data of each output from the demodulators 201 to 204 are rearranged and combined.

In the configuration shown in FIG. 4, TDOA absorption and dummy slot insertion can be performed by using an idle memory of the demodulators 201 to 204.

Figure 5:
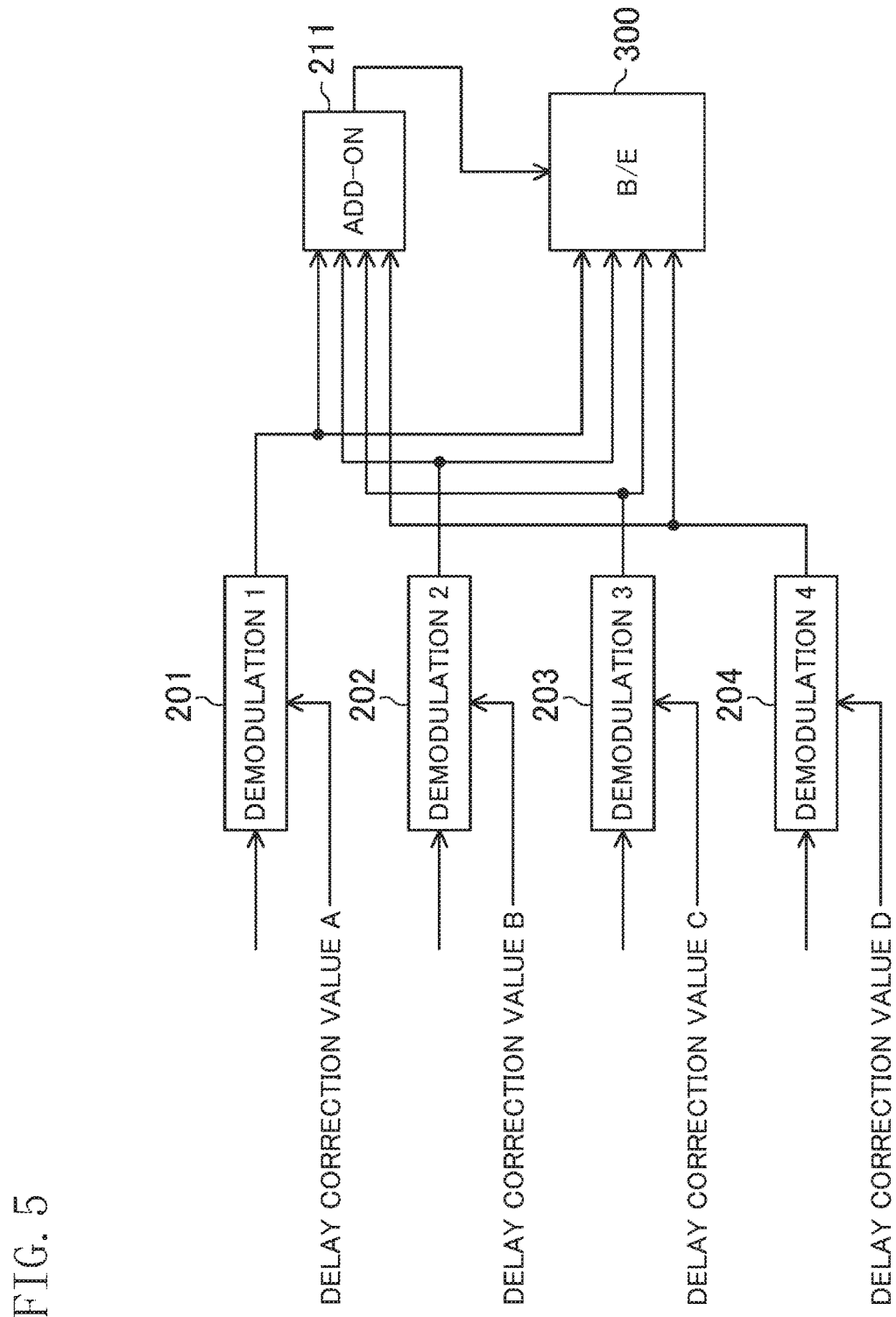
FIG. 5 is a block diagram showing another variation of the receiving system shown in FIG. 3.

FIG. 5 is a block diagram showing another variation of the receiving system shown in FIG. 3. In the receiving system shown in FIG. 5, a delay correction value is input into each of the demodulators 201 to 204. These delay correction values are used to adjust output timing of each of the demodulators 201 to 204.

According to the configuration shown in FIG. 5, for example, a completely synchronously operating system is obtained by allowing the demodulators 201 to 204 to share a crystal oscillator, a delay correction value is externally input into each of the demodulators 201 to 204, and, after delay adjustment, a delay difference of super frames caused by a TDOA of a transmission signal sent to a receiving system is set to 0 (also a dummy slot is inserted), and the delay difference is input into the back-end processor 300. As a result, the add-on 211 does no longer need to have a memory, and may be miniaturized.

Figure 6:
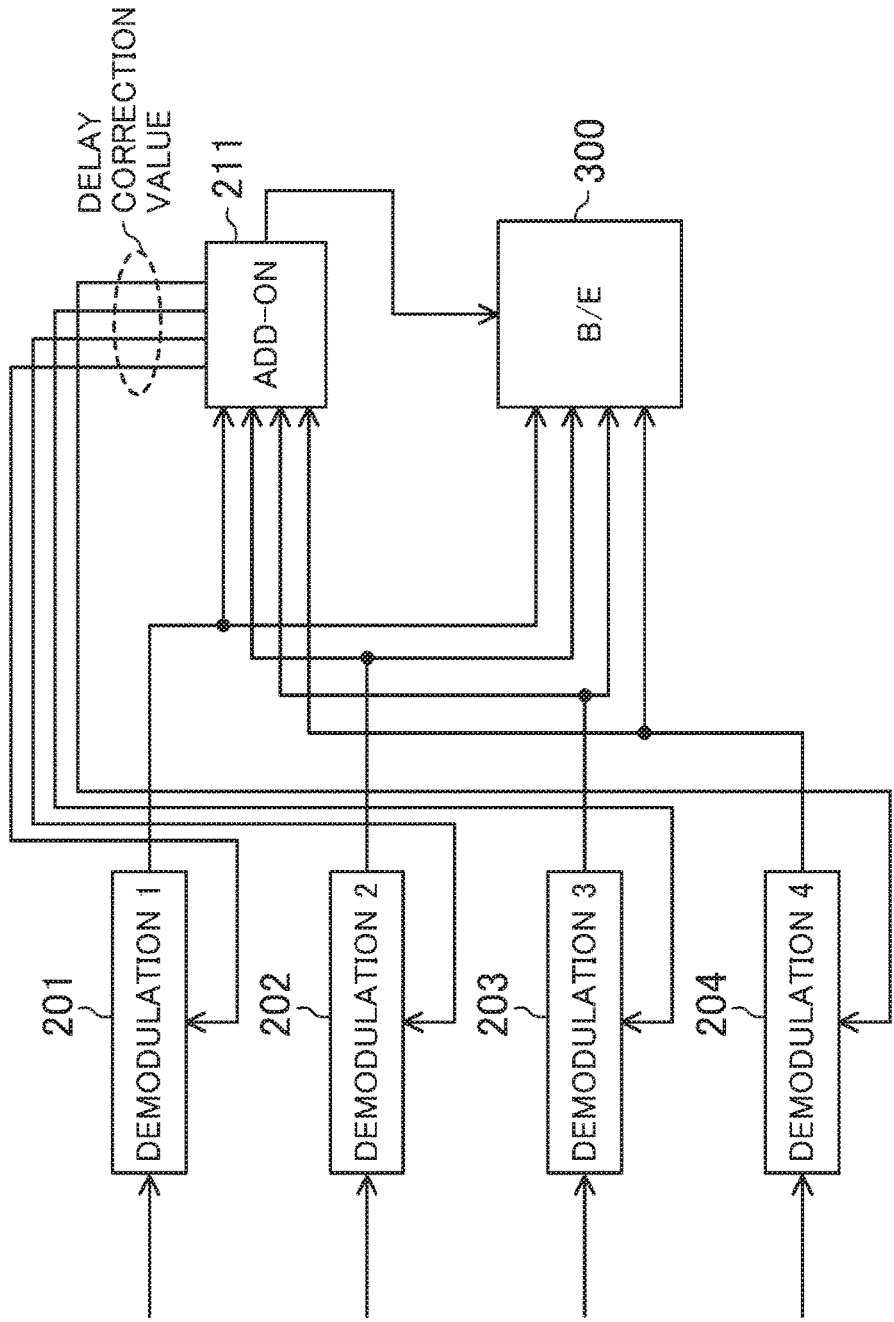
FIG. 6 is a block diagram showing still another variation of the receiving system shown in FIG. 3.

FIG. 6 is a block diagram showing yet still another variation of the receiving system shown in FIG. 3. In the receiving system shown in FIG. 6, the add-on 211 determines a delay difference between each of outputs from the demodulators 201 to 204. Based on the delay difference, the add-on 211 determines a delay correction value for each of the demodulators 201 to 204.

According to the configuration shown in FIG. 6, a delay correction value externally input into each of the demodulators 201 to 204 as shown in FIG. 5 is determined by measuring a TDOA of each stream in the add-on 211.

Figure 7:
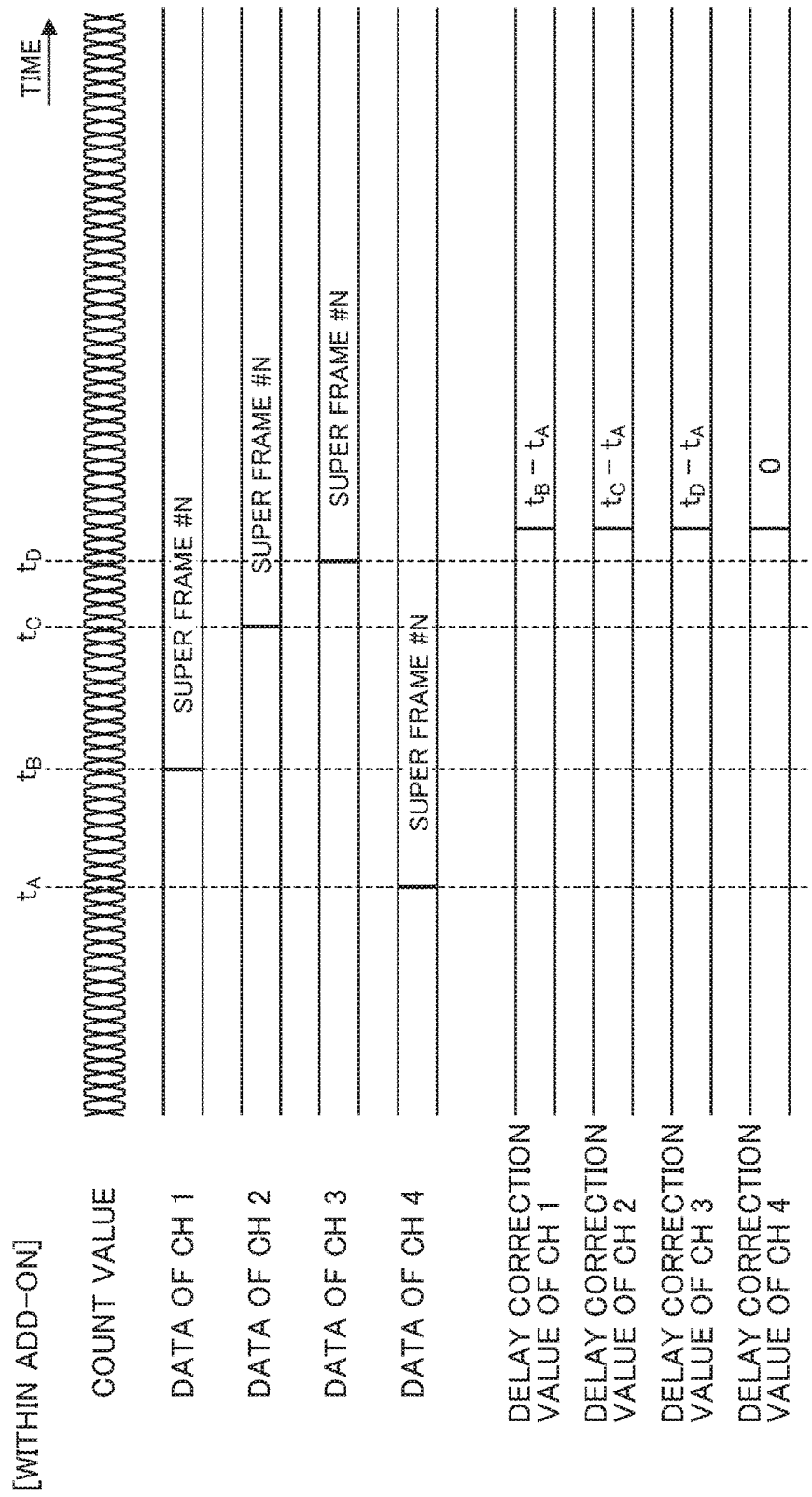
FIG. 7 is a timing diagram for explaining how the receiving system shown in FIG. 6 operates.

FIG. 7 is a timing diagram for explaining how the receiving system shown in FIG. 6 operates. The add-on 211 uses a common counter to determine a TDOA of a beginning of a super frame of each channel with respect to an output of each of the demodulators 201 to 204.

Figure 8:
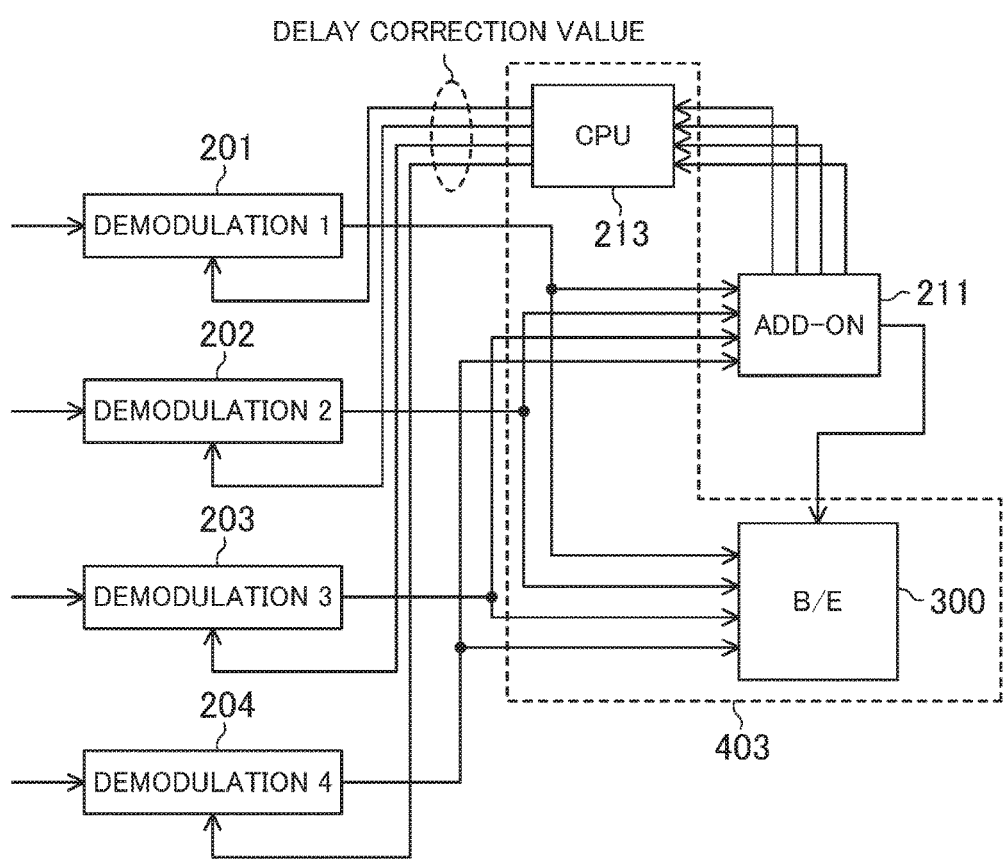
FIG. 8 is a block diagram showing yet still another variation of the receiving system shown in FIG. 3.

FIG. 8 is a block diagram showing yet still another variation of the receiving system shown in FIG. 3. In the receiving system shown in FIG. 8, a delay correction value from the add-on 211 is transferred between chips via a communication circuit, for example via a CPU (central processing unit) 213, through, e.g., an I2C interface. The CPU 213 and the back-end processor 300 may be implemented with one LSI 403.

Figure 9:
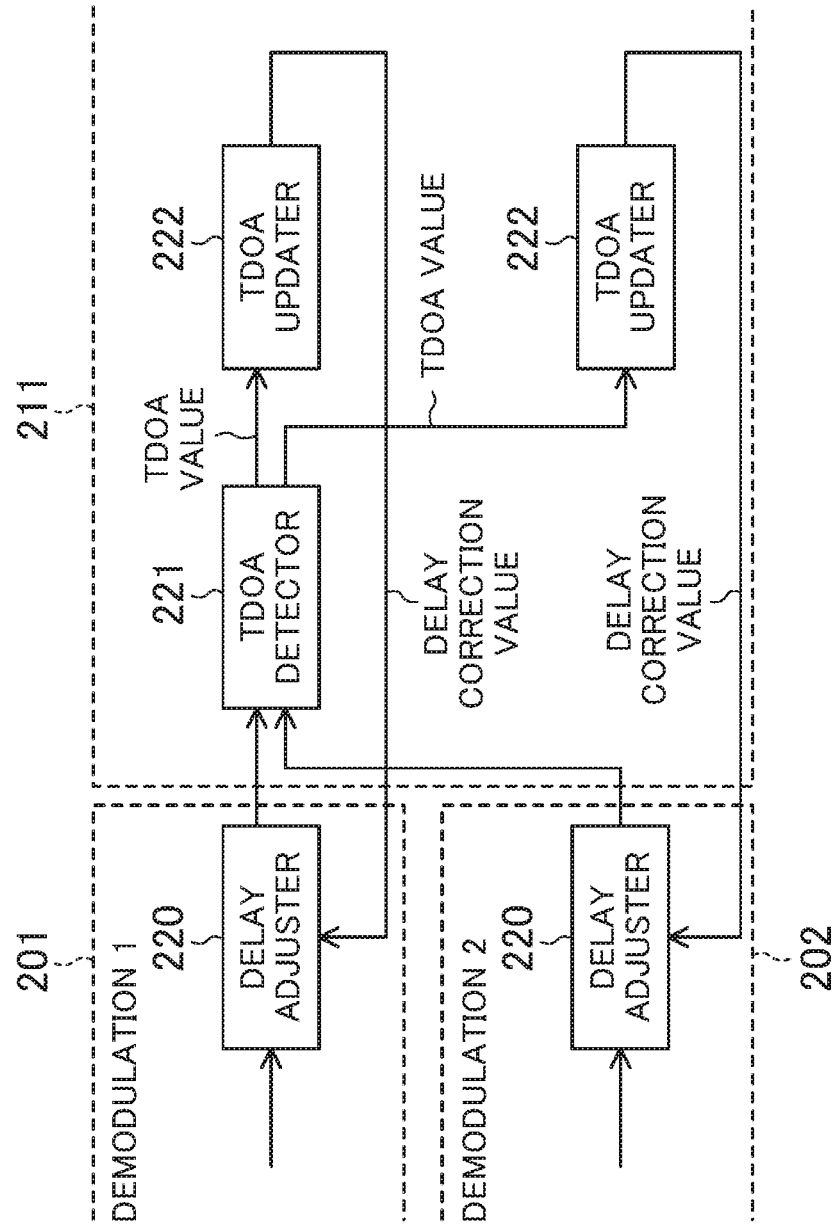
FIG. 9 is a block diagram showing in detail a configuration example of an add-on shown in FIG. 8.

FIG. 9 is a block diagram showing in detail a configuration example of the add-on 211 (and a part of each demodulator) shown in FIG. 8. The demodulators 201, 202 shown in FIG. 9 each include a delay adjuster 220. The add-on 211 includes a TDOA detector 221, and a TDOA updater 222 for each channel. The add-on 211 holds a first delay correction value and a second delay correction value. If a delay difference of continuously input outputs of the demodulators 201, 202 is higher than or equal to a previously set value, the add-on 211 updates the first delay correction value and the second delay correction value held.

Figure 10:
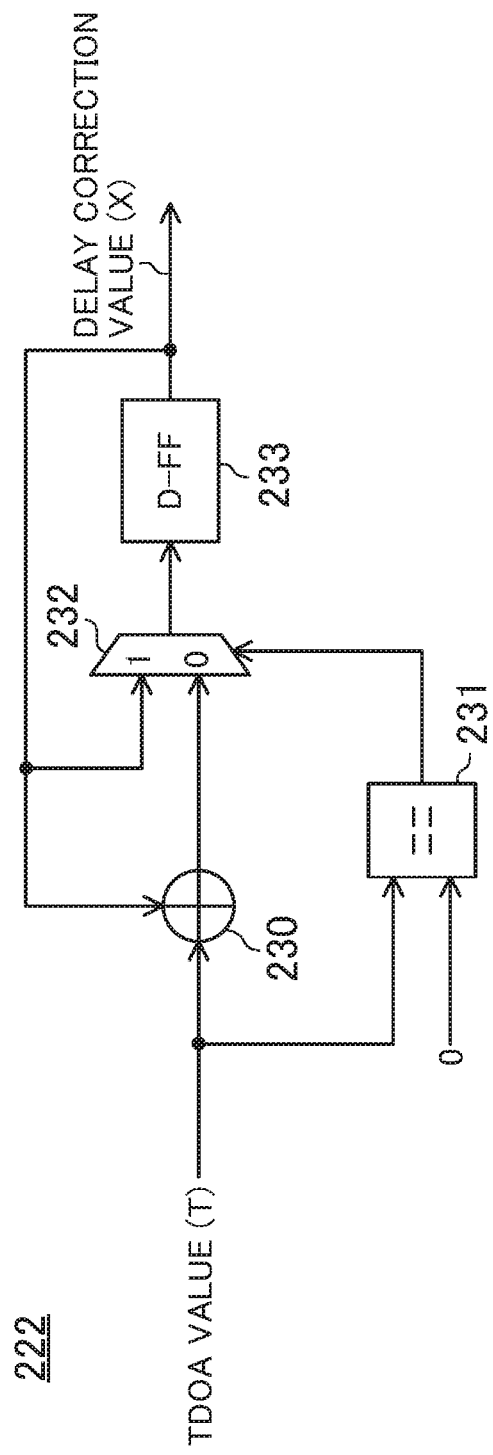
FIG. 10 is a block diagram showing in detail a configuration example of a TDOA updater shown in FIG. 9.

FIG. 10 is a block diagram showing in detail a configuration example of a TDOA updater 222 shown in FIG. 9. The TDOA updater 222 shown in FIG. 10 includes an adder 230, a comparator 231, a selector 232, and a D-FF (delay flip-flop) 233.

Figure 11:
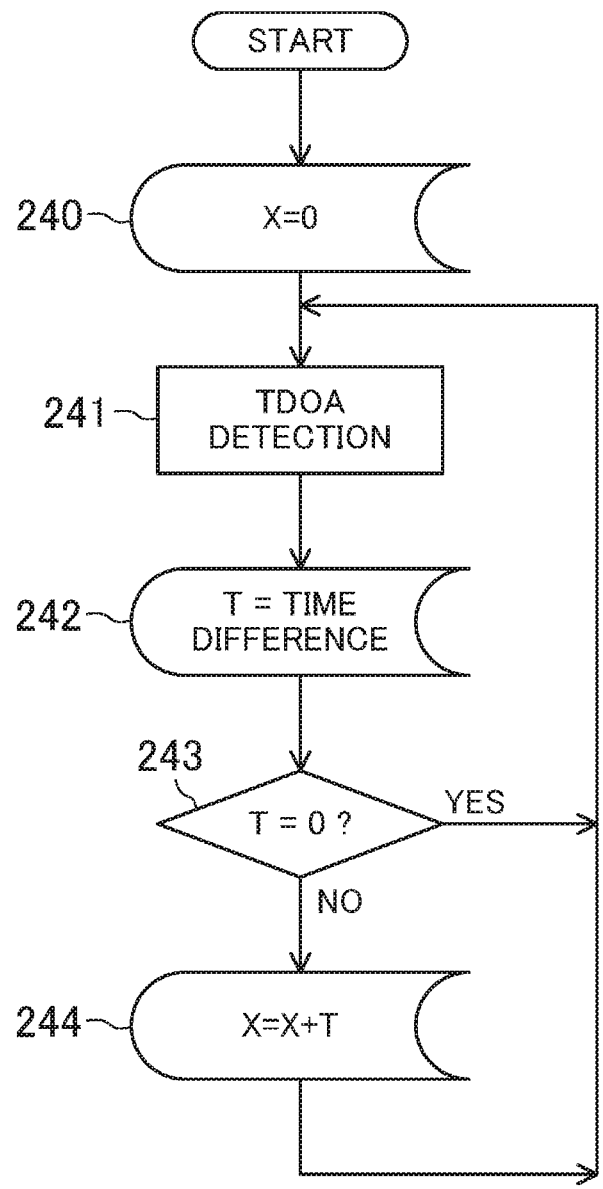
FIG. 11 is a flowchart for explaining how the TDOA updater shown in FIG. 10 operates.

FIG. 11 is a flowchart for explaining in steps 240 to 244 how the TDOA updater 222 shown in FIG. 10 operates. In an initial state, a delay correction value X is set to 0. When data are started to be received, a TDOA value T between channels is defined as T1. If at this point T1 is not 0, the value of X is updated. Next, T becomes 0 as a signal whose delay is adjusted by T1 is input into a TDOA detector 221. If T=0, the value of X is held without being updated. Given that fluctuation takes place in a transmission line and that the TDOA has been changed from T1 to T2, a TDOA value T detected is T3=T2−X because a signal whose delay is adjusted by X=T1 is input into the TDOA detector 221. Consequently, in order to set the delay correction value X to T2, the value X can be updated using the equation T2=T3+X.

As described above, according to the configuration shown in FIG. 9, the delay correction values input into each of the demodulators 201 to 204 are determined by detecting a TDOA of streams in the add-on 211. Then, while the delay correction values provided for each of the demodulators 201 to 204 are held, fluctuations of delay values are monitored, and the delay correction values are changed when the TDOA changes.

Figure 12:
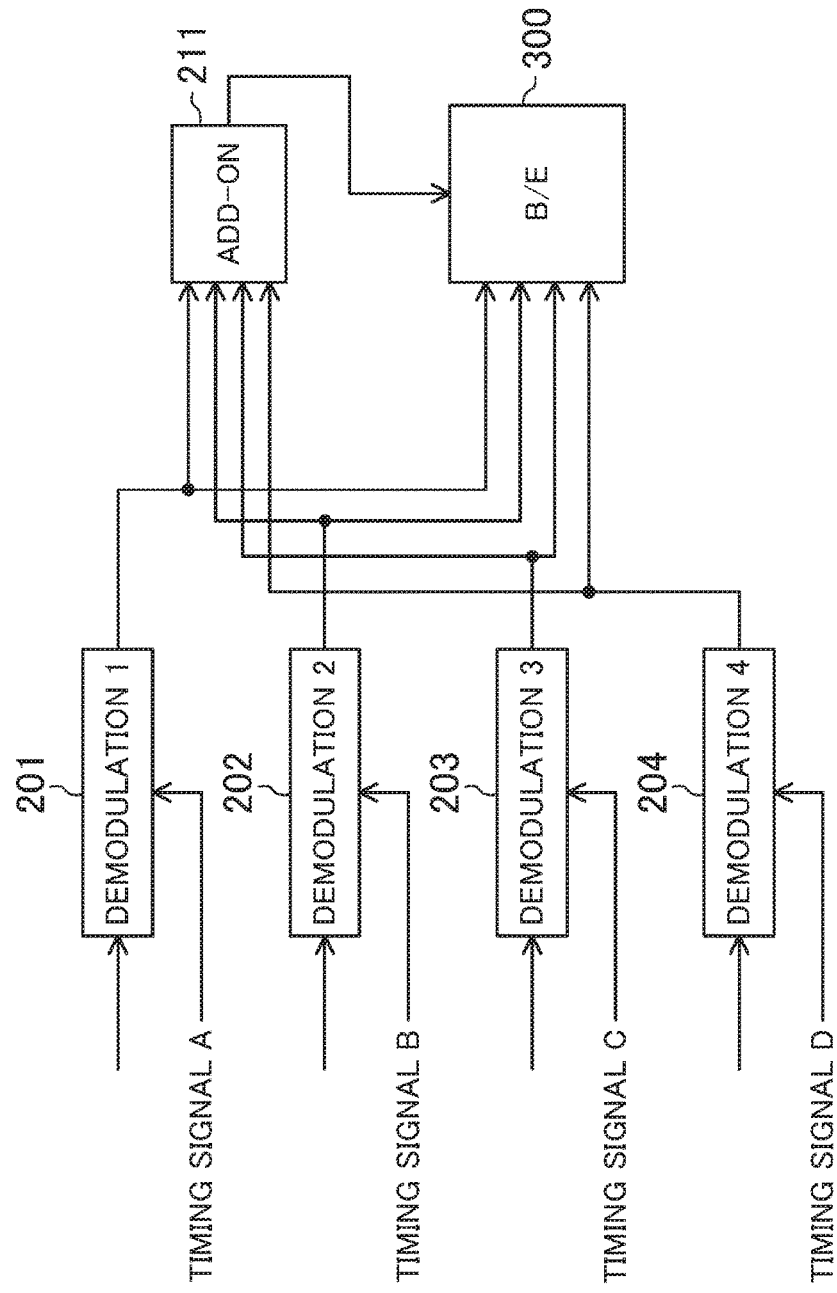
FIG. 12 is a block diagram showing yet still another variation of the receiving system shown in FIG. 3.

FIG. 12 is a block diagram showing yet still another variation of the receiving system shown in FIG. 3. In the receiving system shown in FIG. 12, a timing signal is input into each of the demodulators 201 to 204. These timing signals are used to adjust output timing of each of the demodulators 201 to 204.

According to the configuration shown in FIG. 12, an external timing signal is provided for each of the demodulators 201 to 204, and delay adjustment is performed in each of the demodulators 201 to 204 based on these timing signals.

Figure 13:
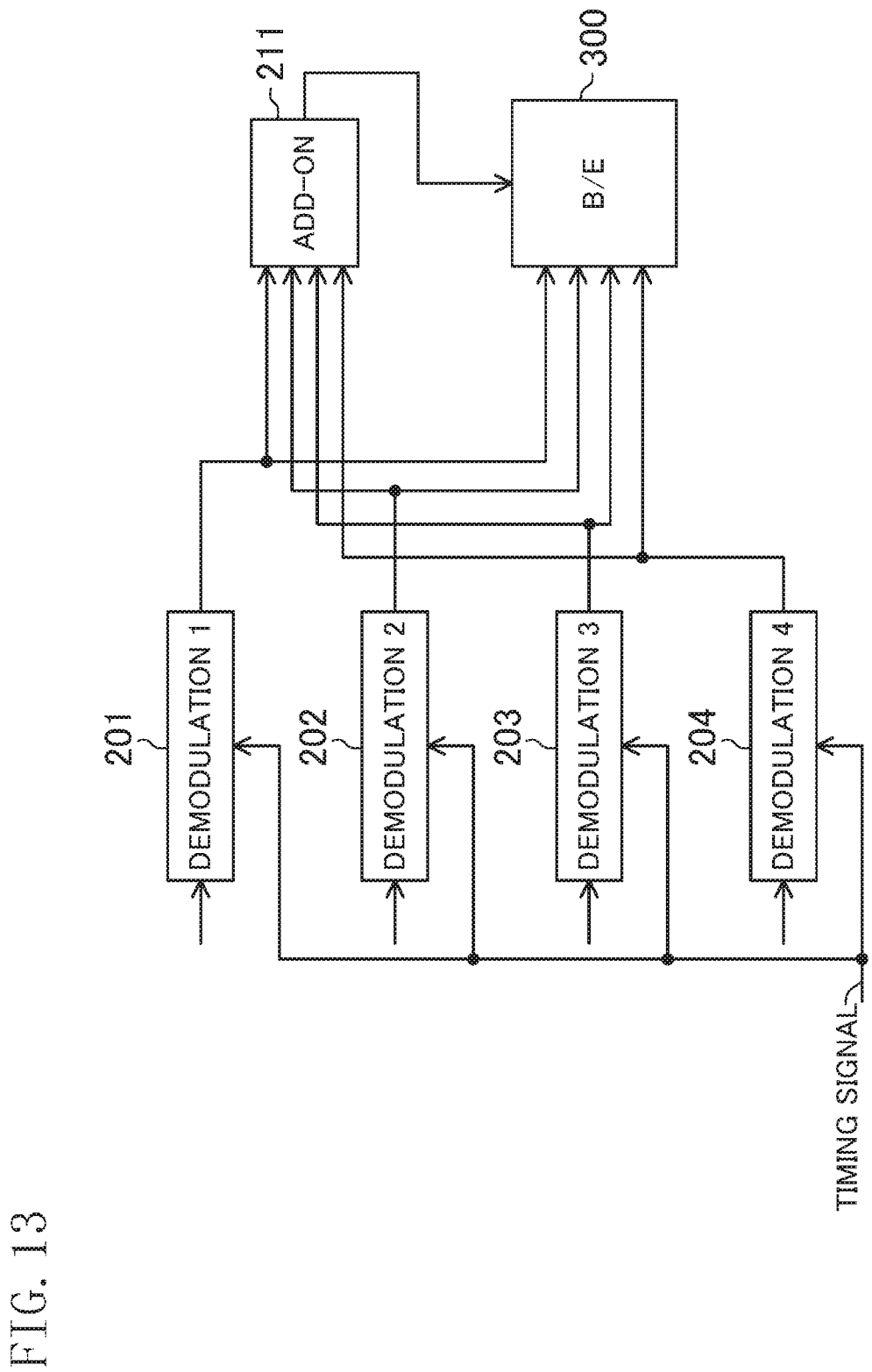
FIG. 13 is a block diagram showing yet still another variation of the receiving system shown in FIG. 3.

FIG. 13 is a block diagram showing yet still another variation of the receiving system shown in FIG. 3. In the receiving system shown in FIG. 13, the same timing signal (e.g., a reset signal) is input into each of the demodulators 201 to 204. This timing signal is used to adjust output timing of each of the demodulators 201 to 204.

According to the configuration shown in FIG. 13, a timing signal is externally provided to be shared by each of the demodulators 201 to 204, and delay adjustment is performed in each of the demodulators 201 to 204 based on this timing signal.

Figure 14:
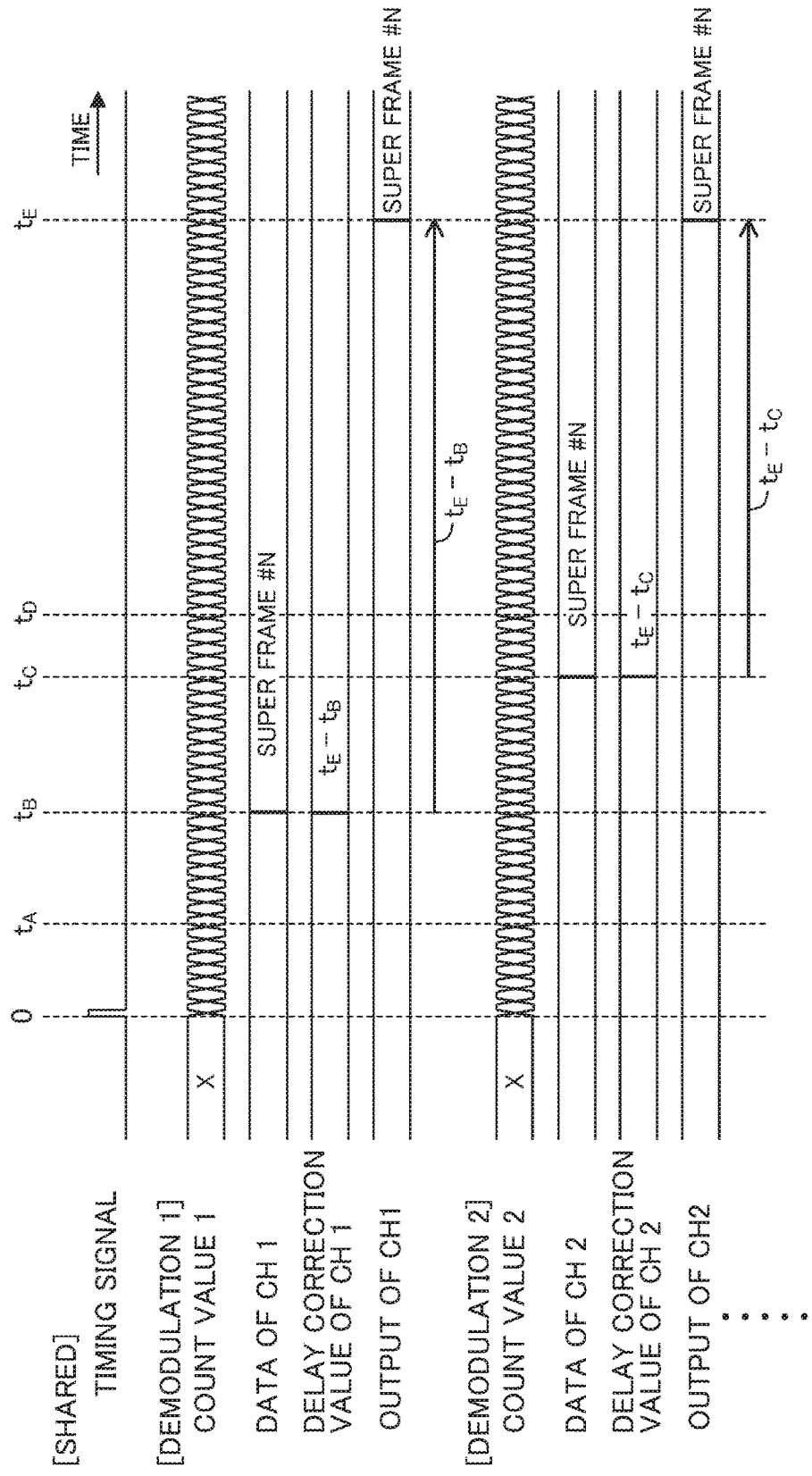
FIG. 14 is a timing diagram for explaining how the receiving system shown in FIG. 13 operates.

FIG. 14 is a timing diagram for explaining how the receiving system shown in FIG. 13 operates. According to FIG. 14, the add-on 211 determines, based on a reset termination time, arrival times ($t_A$ to $t_D$) of the beginnings of the super frames of each channel, determines a difference to a previously set arrival time ($t_E$), and sets this difference as a delay correction value.

Figure 15:
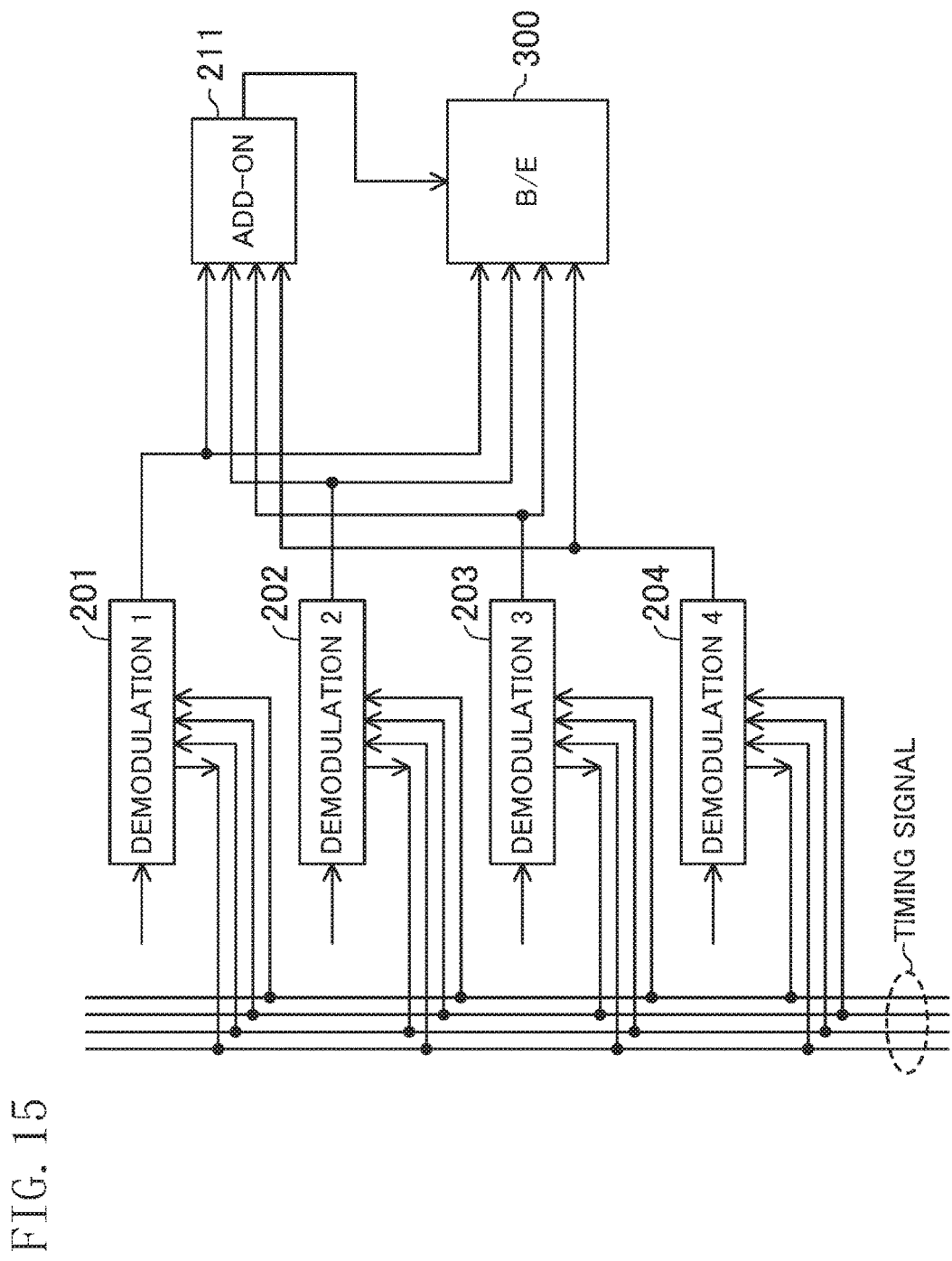
FIG. 15 is a block diagram showing yet still another variation of the receiving system shown in FIG. 3.

FIG. 15 is a block diagram showing yet still another variation of the receiving system shown in FIG. 3. In the receiving system shown in FIG. 15, each of the demodulators 201 to 204 is configured to receive a timing signal from another demodulator. That is, the demodulators 201 to 204 generate timing signals for delay adjustment to be interconnected with one another.

Figure 16:
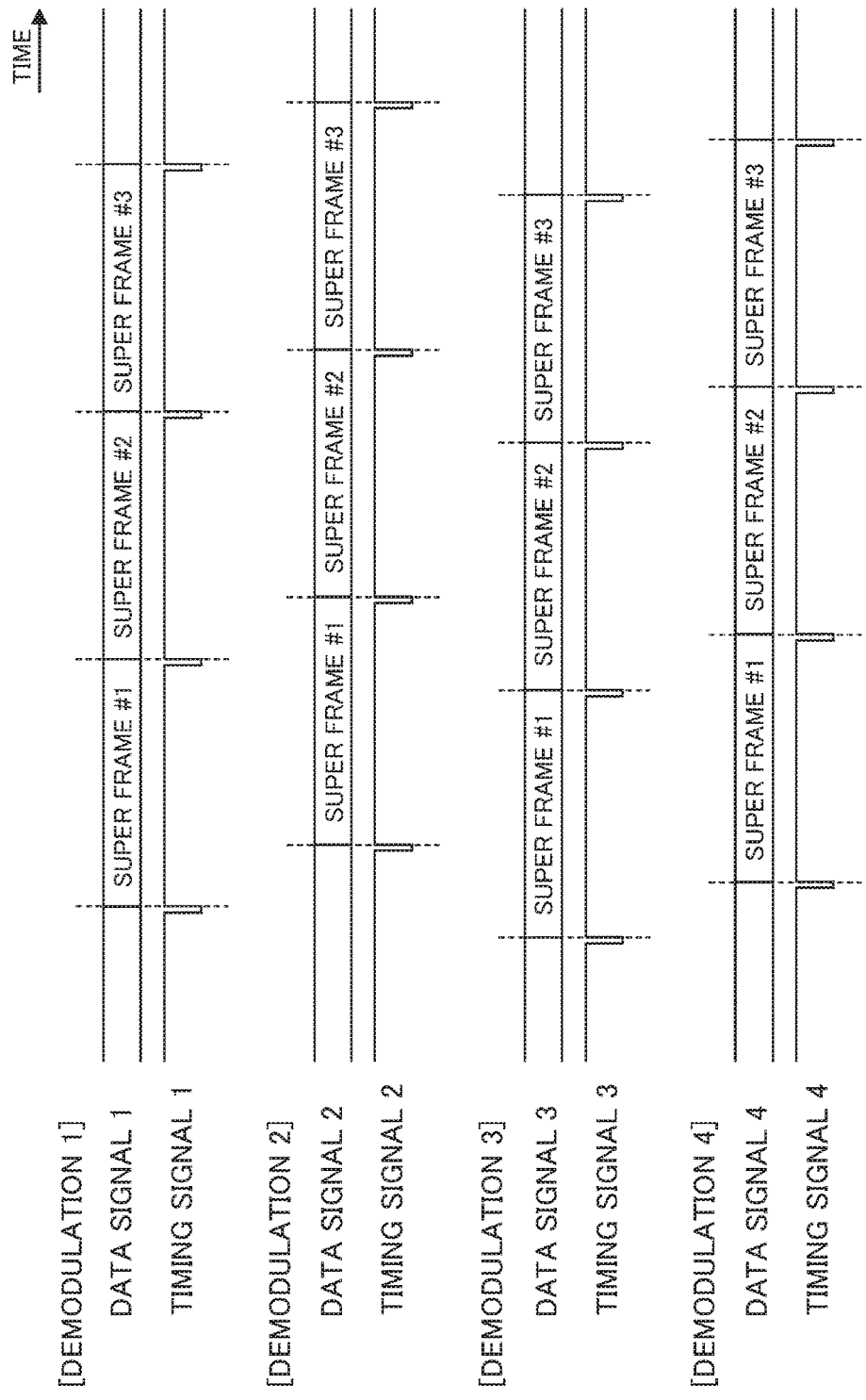
FIG. 16 is a timing diagram for explaining how the receiving system shown in FIG. 15 operates.

FIG. 16 is a timing diagram for explaining how the receiving system shown in FIG. 15 operates. Here, a timing signal from each of the demodulators 201 to 204 can, for example, indicate a signal of 1 bit asserted at the beginning of the super frame.

Figure 17:
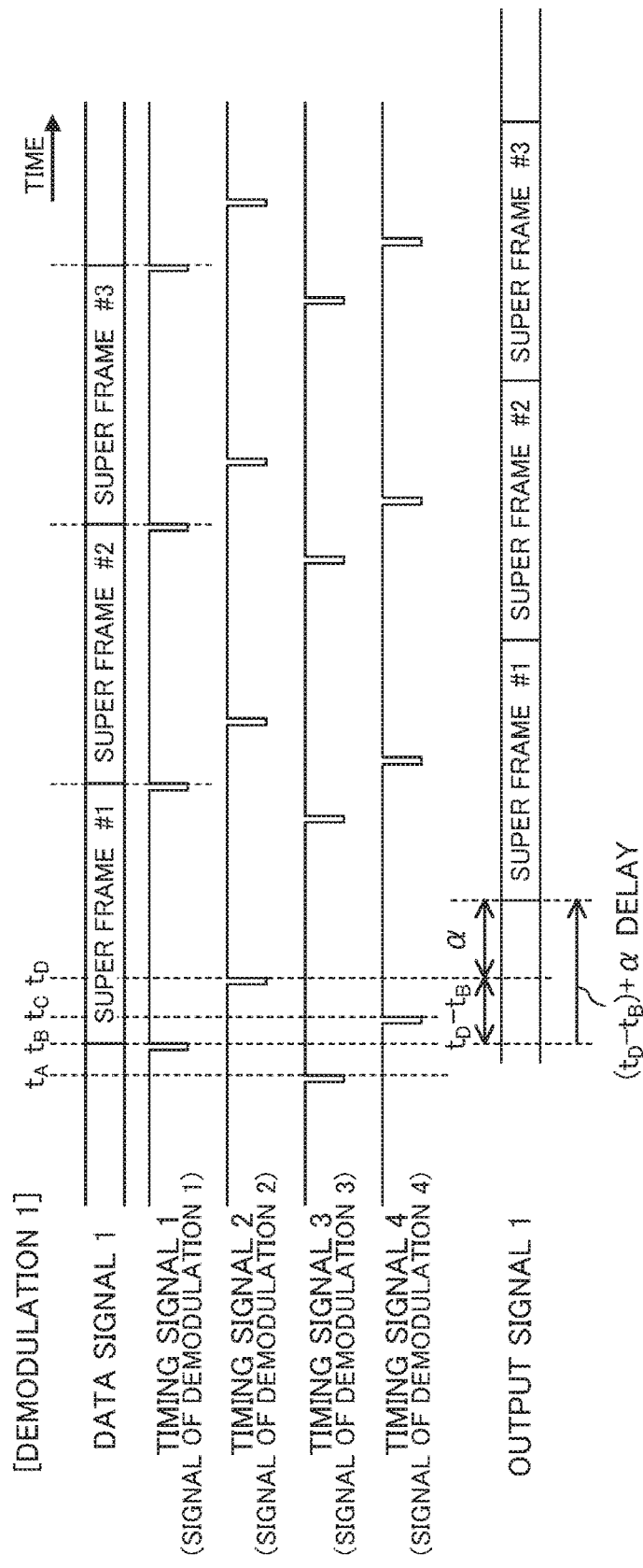
FIG. 17 is a timing diagram for explaining in detail how the receiving system shown in FIG. 15 operates.

FIG. 17 is a timing diagram for explaining in detail how the receiving system shown in FIG. 15 operates. For example, the demodulator 201 determines a value $(t_D-t_B)+\alpha$ as delay correction value. Here, a constant delay time a is added to a difference between the arrival time $t_D$ of the most delayed timing signal and the arrival time $t_B$ of the timing signal of the demodulator 201 itself. The value a may be, for example, the time it takes the demodulator to deliver a valid output after having started processing.

Figure 18:
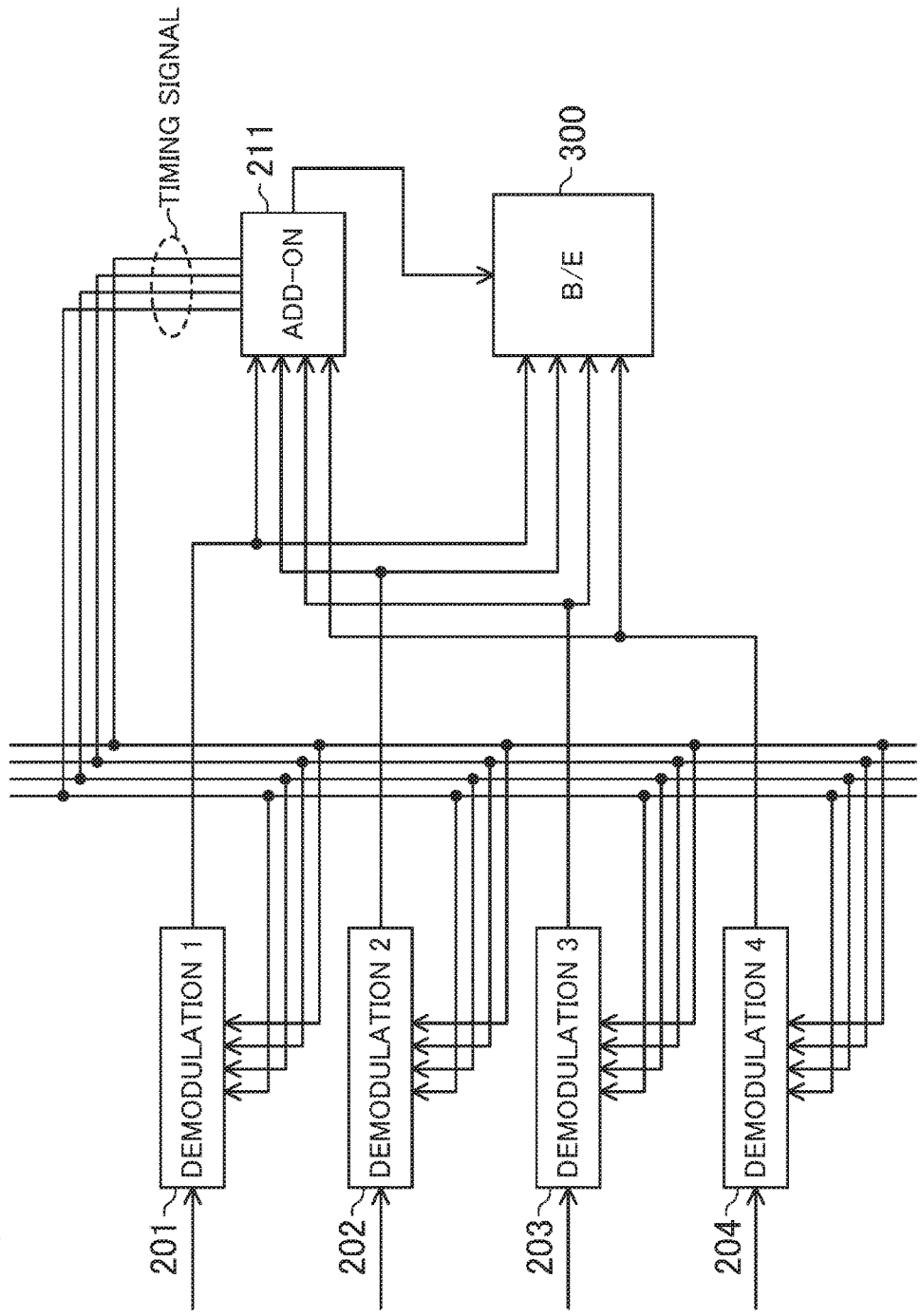
FIG. 18 is a block diagram showing yet still another variation of the receiving system shown in FIG. 3.

FIG. 18 is a block diagram showing yet still another variation of the receiving system shown in FIG. 3. In the receiving system shown in FIG. 18, the add-on 211 generates the timing signal of each of the demodulators 201 to 204.

According to the configuration shown in FIG. 18, the TDOA of each stream is detected in the add-on 211, the add-on 211 outputs a timing signal for each of the demodulators 201 to 204, and a delay difference of a super frame is set to 0 and input into the back-end processor 300. As a result, the add-on 211 does no longer need to have a memory, and may be miniaturized.

Figure 19:
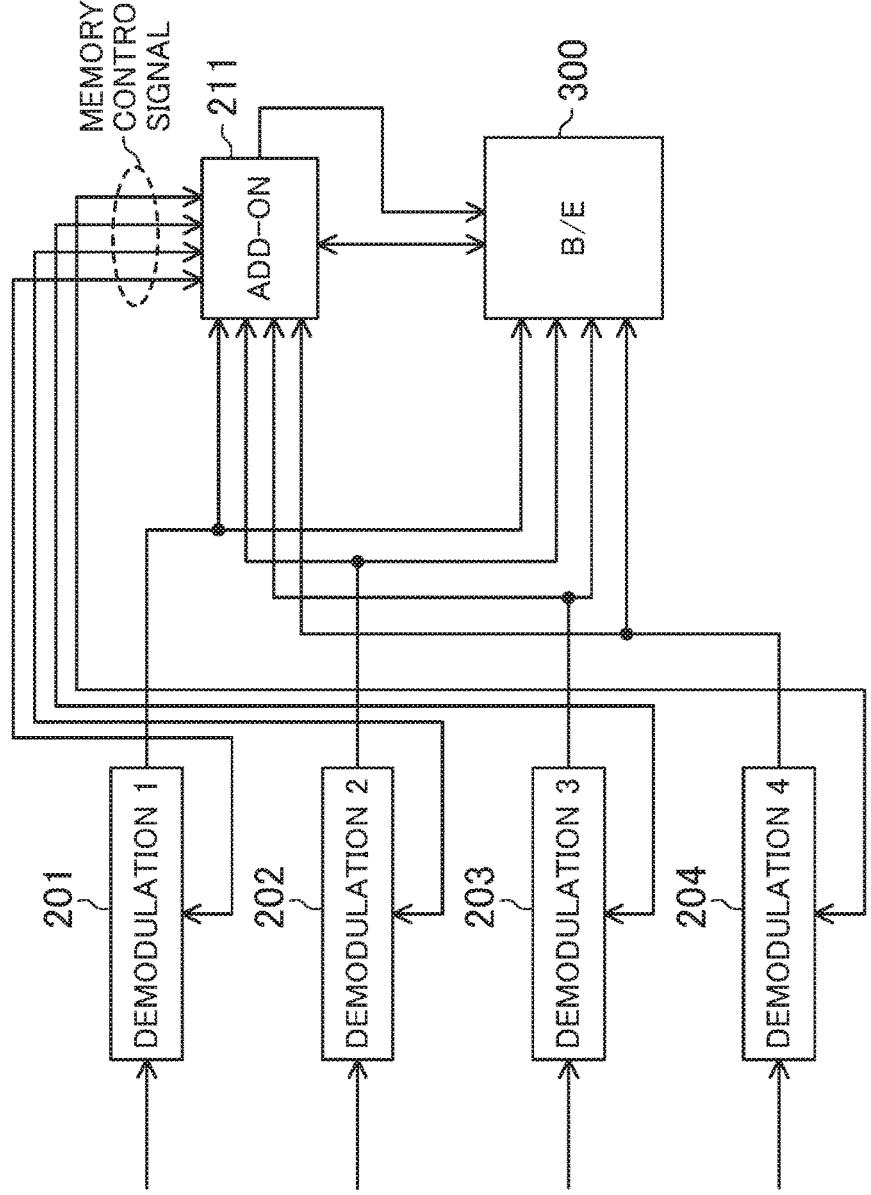
FIG. 19 is a block diagram showing yet still another variation of the receiving system shown in FIG. 3.

FIG. 19 is a block diagram showing yet still another variation of the receiving system shown in FIG. 3. In the receiving system shown in FIG. 19, a connection of a memory control signal allowing the add-on 211 to access each of the demodulators 201 to 204 is provided between the add-on 211 and the demodulators 201 to 204.

According to the configuration shown in FIG. 19, an idle memory of the demodulators 201 to 204 or the back-end processor 300 is used as a memory necessary for receiving data. Therefore, the add-on 211 does not need to have a memory, and may be miniaturized.

Second Embodiment

Figure 20:
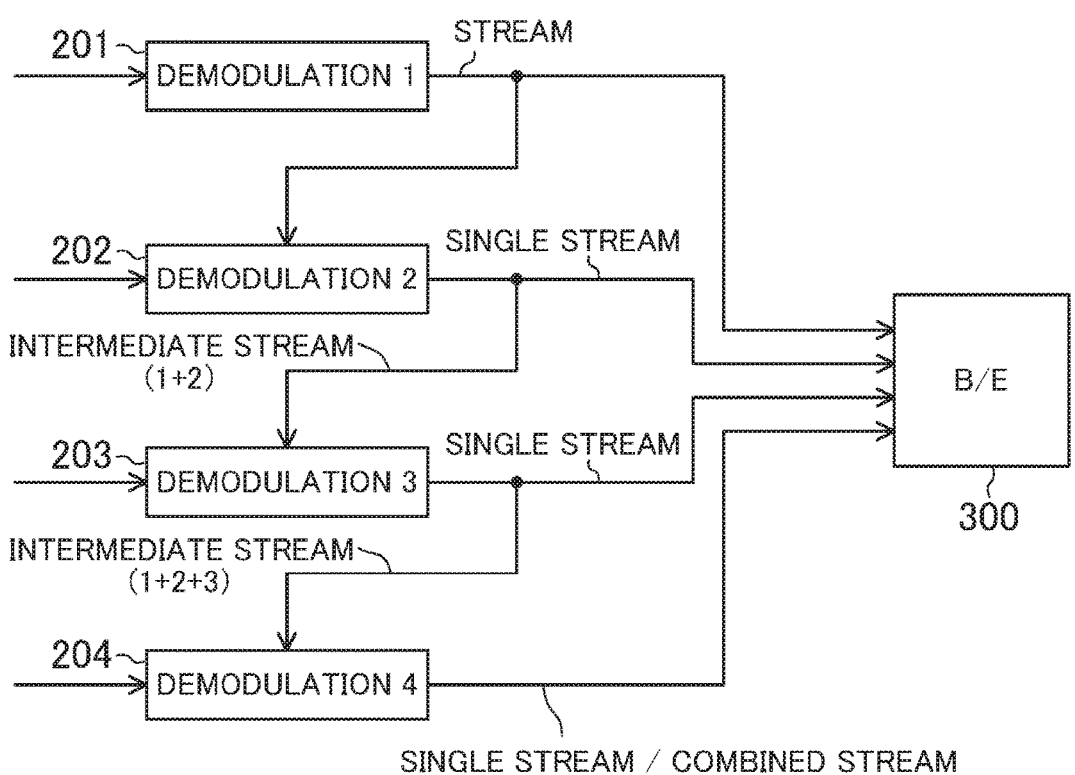
FIG. 20 is a block diagram showing a configuration of a receiving system according to a second embodiment.

FIG. 20 is a block diagram showing a configuration of a receiving system according to a second embodiment. In the receiving system shown in FIG. 20, in each of the demodulators 201 to 204, data are sequentially combined to generate a combined stream. In a receiving mode in single channel transmission, the back-end processor 300 processes data output by the demodulators 201 to 204 individually. In a receiving mode in multiple channel transmission, the back-end processor 300 processes only the combined stream from the demodulator 204.

FIG. 21A is a block diagram showing a variation of the receiving system shown in FIG. 20, and FIG. 21B is a timing diagram for explaining how the variation of the receiving system shown in FIG. 21A operates. Here, the demodulators 201 to 204 increase the data rate stepwise in the order the data are combined. Note that many variations are possible depending on the order the data are combined and on whether there is a dummy slot (D) of a 64-QAM stream.

FIG. 22A is a block diagram showing another variation of the receiving system shown in FIG. 20. FIG. 22B is a timing diagram for explaining how this variation of the receiving system shown in FIG. 22A operates. Here, the demodulators 201 to 204 increase a data rate of the demodulator 201 in the front to reach a data rate of the demodulator 204 in the back. Where data lack, the demodulators 201 to 204 insert a dummy slot (D) as a padding. The demodulators 201 to 204 exchange the data in this order. Note that also in this example many variations are possible depending on the combination order and on whether there is the dummy slot (D) of a 64-QAM stream.

Figure 23A:
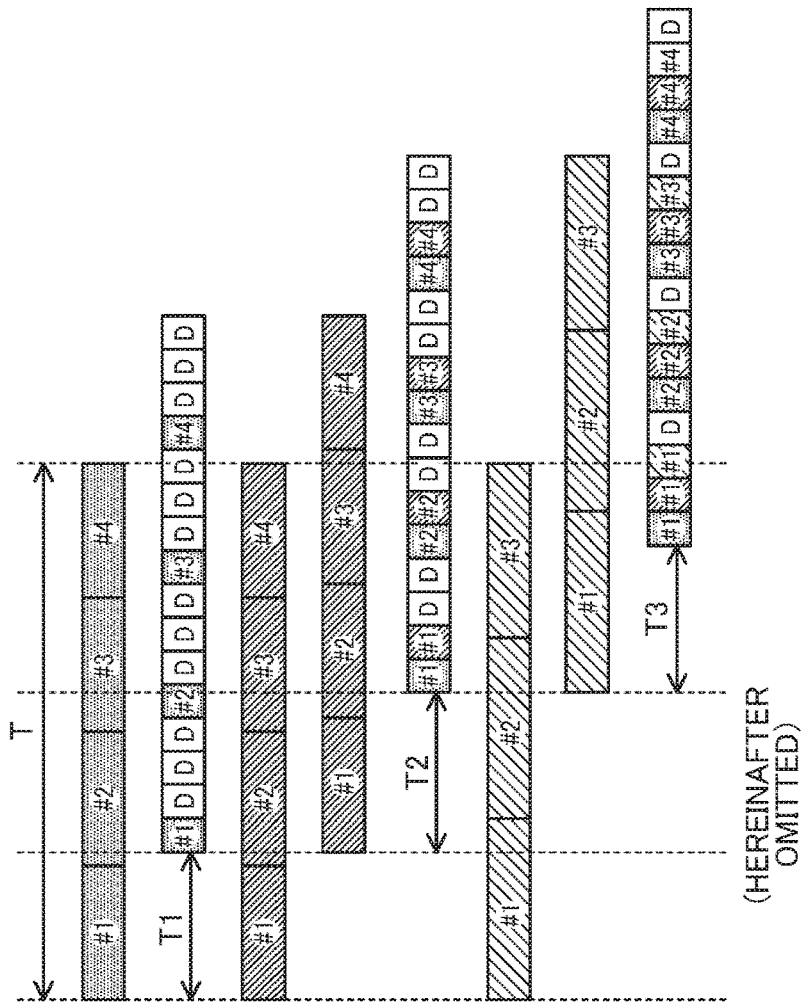
FIG. 23A is a block diagram showing yet another variation of the receiving system shown in FIG. 20.
Figure 23B:
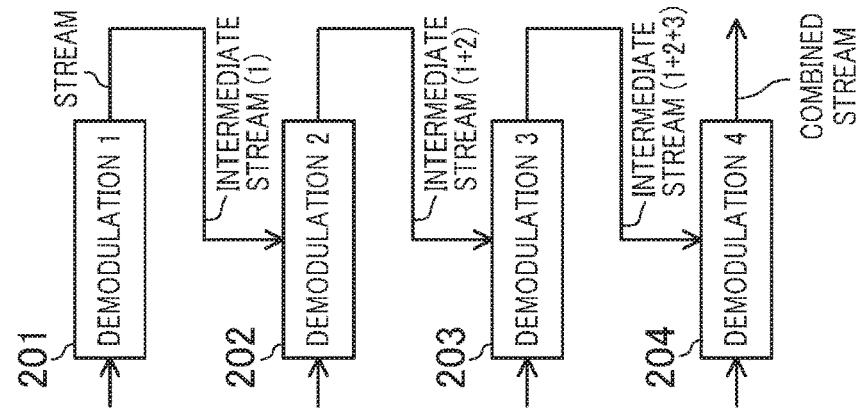
FIG. 23B is a timing diagram for explaining how this variation of the receiving system shown in FIG. 23A operates.

FIG. 23A is a block diagram showing yet still another variation of the receiving system shown in FIG. 20, and FIG. 23B is a timing diagram for explaining how this variation of the receiving system shown in FIG. 23A operates. Here, the demodulators 201 to 204 share each of their processing delay values which have been embedded during design of the system. Alternatively, the demodulators 201 to 204 may exchange signals to share their processing delay values among each other. In each of the demodulators 201 to 204, deferred processing is performed based on these values. In FIG. 23B, a processing delay value of the demodulator 201 is T1, a processing delay value of the demodulator 202 is T2, and a processing delay value of the demodulator 203 is T3.

According to the example shown in FIGS. 23A and 23B, the processing delay values are shared among the demodulators 201 to 204, and deferred processing is performed in the demodulators 201 to 204 in accordance with the processing delay values. Note that, alternatively, the processing delay values may be externally set for each of the demodulators 201 to 204.

Figure 24A:
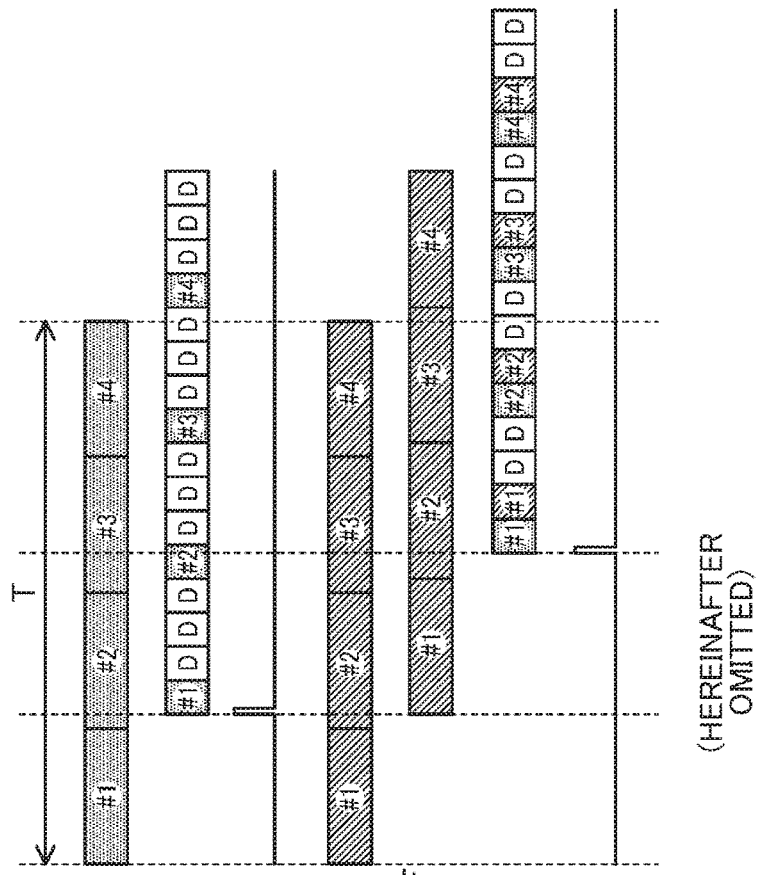
FIG. 24A is a block diagram showing yet still another variation of the receiving system shown in FIG. 20.
Figure 24B:
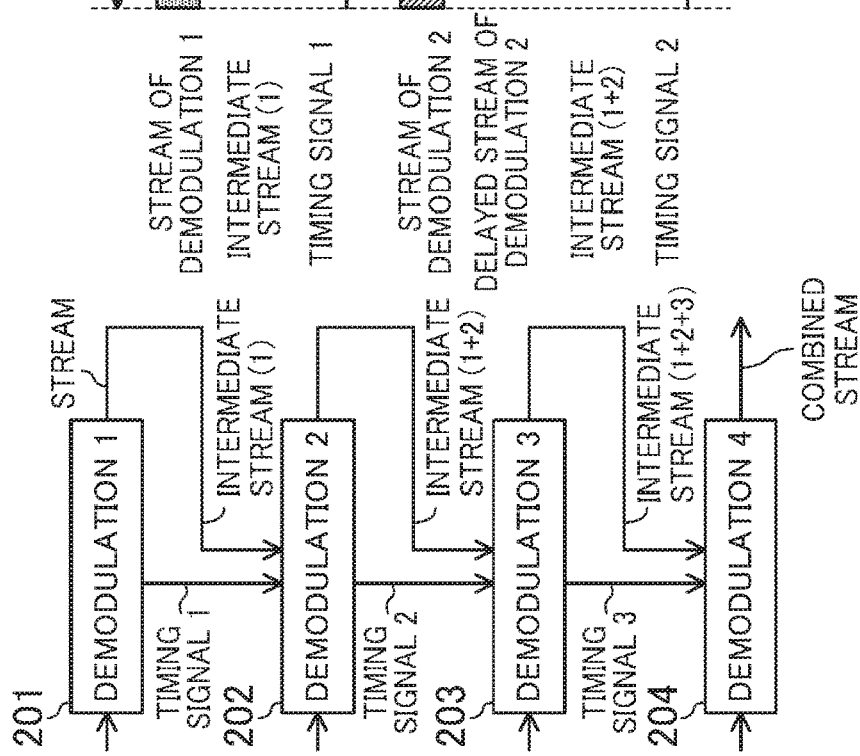
FIG. 24B is a timing diagram for explaining how this variation of the receiving system shown in FIG. 24A operates.

FIG. 24A is a block diagram showing yet still another variation of the receiving system shown in FIG. 20, and FIG. 24B is a timing diagram for explaining how this variation of the receiving system shown in FIG. 24A operates. Here, the demodulators 201 to 203 output a timing signal which indicates a processing start time to the subsequent demodulators 202 to 204.

According to the example shown in FIGS. 24A and 24B, TDOA absorption is implemented by adding a timing signal synchronous with the data.

FIG. 25A is a block diagram showing yet still another variation of the receiving system shown in FIG. 20, and FIG. 25B is a timing diagram for explaining how this variation of the receiving system shown in FIG. 25A operates. Here, data processing starts when the demodulators 202 to 204 observe a predetermined data sequence (e.g., a TSMF header) among data obtained from the previous demodulators 201 to 203.

According to the example shown in FIGS. 25A and 25B, TDOA absorption can be implemented by inserting a known data sequence into a stream as a reference for timing synchronization.

Figure 26:
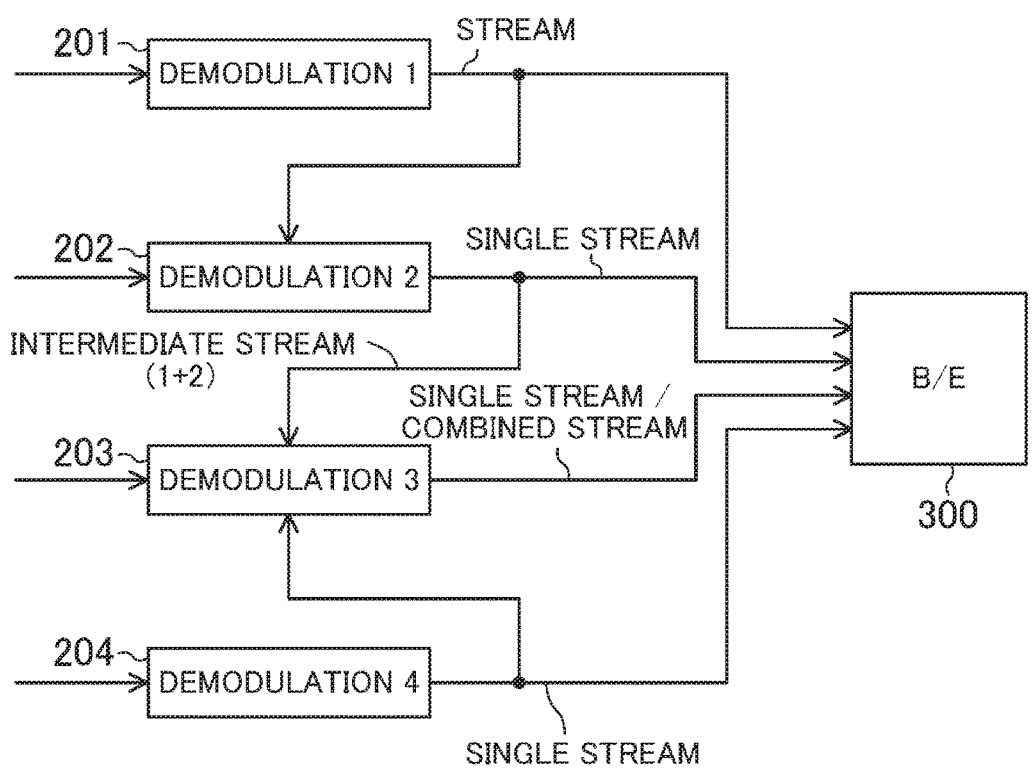
FIG. 26 is a block diagram showing yet still another variation of the receiving system shown in FIG. 20.

FIG. 26 is a block diagram showing yet still another variation of the receiving system shown in FIG. 20. Here, sequential data processing in the demodulators 201, 202 and data processing in the demodulator 204 are performed in parallel, and then in the demodulator 203 the data are packaged into one combined stream. That is, the data are combined in the demodulators 201 to 204 in a tournament-like manner to generate a combined stream.

Third Embodiment

Figure 27:
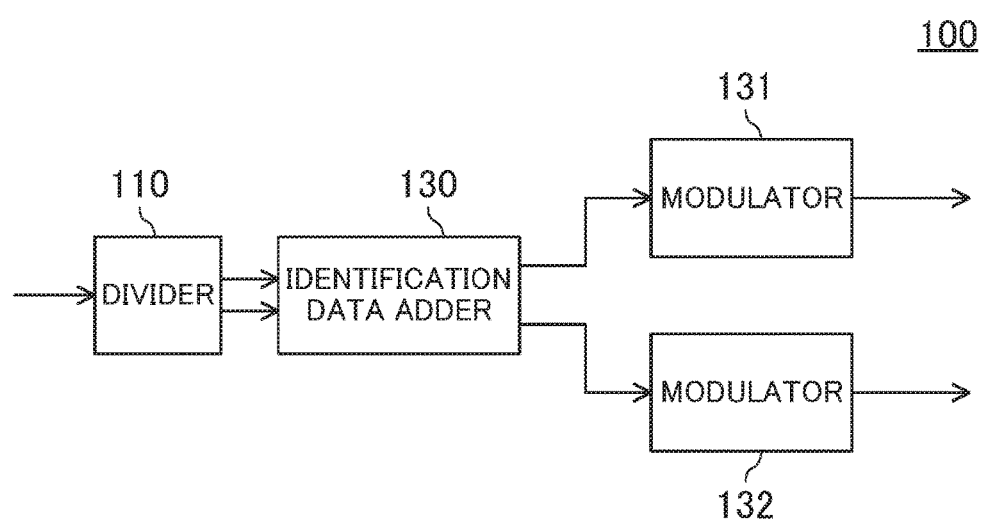
FIG. 27 is a block diagram showing a configuration of a transmitting system according to a third embodiment.

FIG. 27 is a block diagram showing a configuration of a transmitting system according to a third embodiment. The transmitter 100 of this transmitting system includes the divider 110, one identification data adder 130, and the modulators 131, 132. The divider 110 divides one input signal into a plurality of signals and outputs these signals. The identification data adder 130 adds identification data (index numbers) to a predetermined group (super frame) of divided signals among the signals divided by the divider 110. The modulators 131, 132 process each of the divided signals added by the identification data and output a transmission signal. The identification data may be data which are identical for each predetermined group, or may be data which differ in each divided data for each predetermined group in accordance with a formula already shared between a sending side and a receiving side. The index number of the super frame added is contained in the header information.

Figure 28:
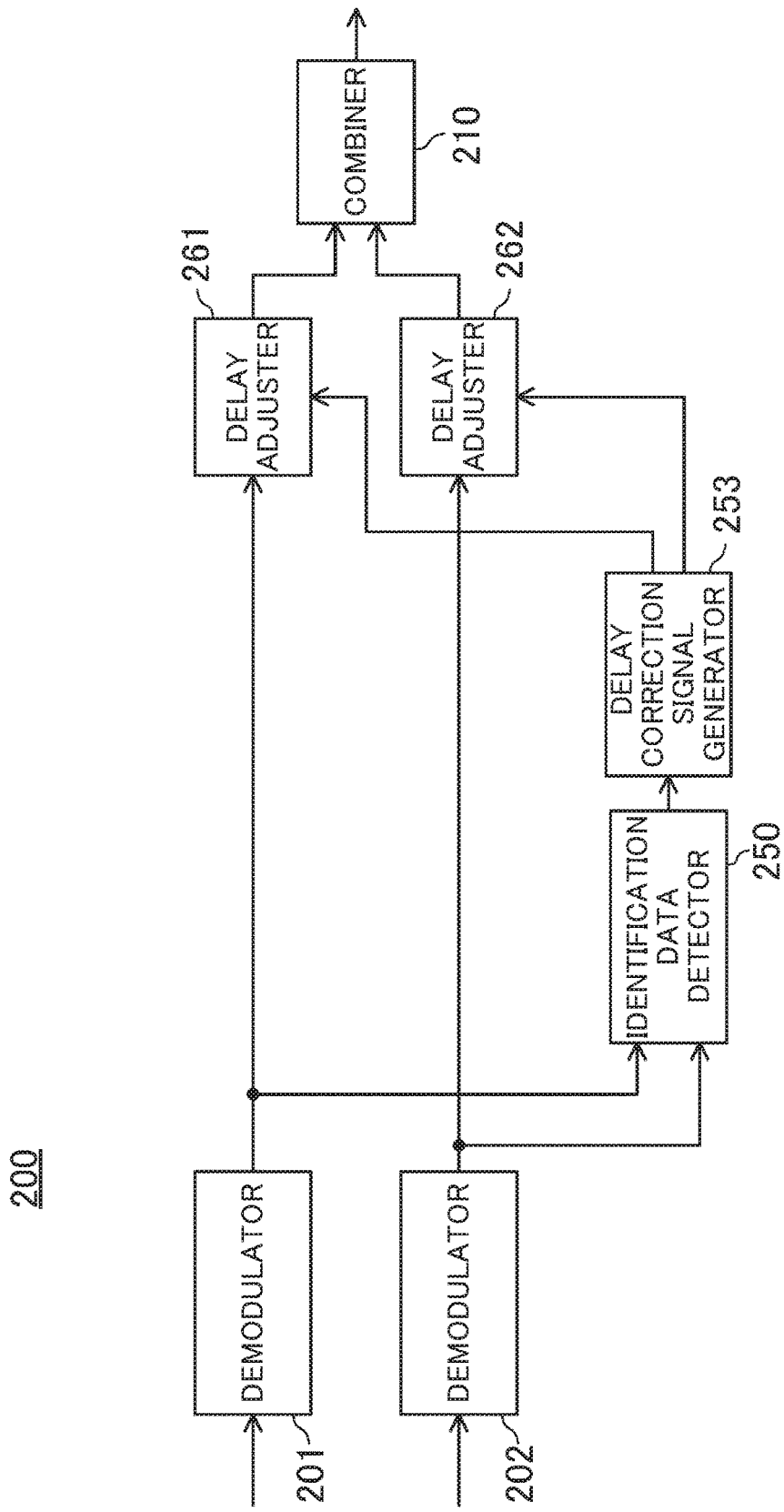
FIG. 28 is a block diagram showing a configuration of a receiving system according to the third embodiment.

FIG. 28 is a block diagram showing a configuration of a receiving system according to the third embodiment. The receiver 200 of this receiving system includes the demodulators 201, 202, one identification data detector 250, one delay correction signal generator 253, delay adjusters 261, 262, and one combiner 210. The identification data detector 250 identifies identification data (index numbers) added to a predetermined group (super frame) of outputs from the demodulators 201, 202. The delay correction signal generator 253 uses detecting results provided by the identification data detector 250 to generate delay correction signals for the outputs from the demodulators 201, 202. Based on the delay correction signals, the delay adjusters 261, 262 delay the outputs from the demodulators 201, 202 and output post-delay-adjustment signals. The combiner 210 generates at least one stream based on the post-delay-adjustment signals.

Figure 29A:
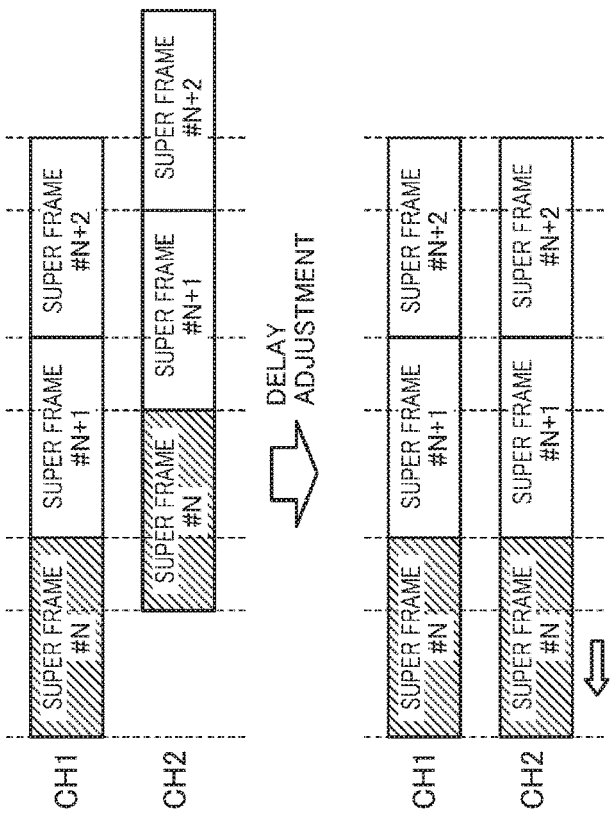
FIGS. 29A and 29B are timing diagrams for explaining how the transmitting and receiving systems shown in FIGS. 27 and 28 operate.
Figure 29B:
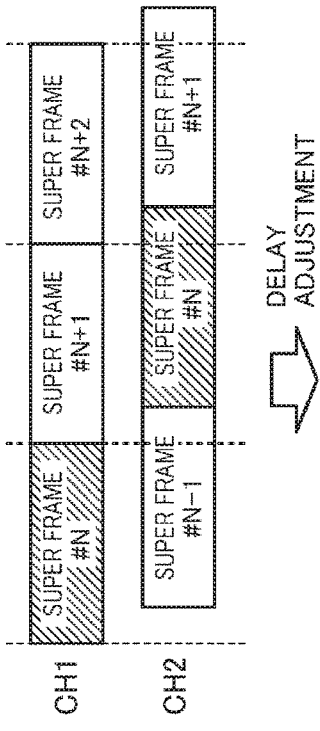

FIGS. 29A and 29B are timing diagrams for explaining how the transmitting and receiving systems shown in FIGS. 27 and 28 operate. Here, an index number of a super frame is used for delay adjustment. As shown in FIG. 29A, this allows to absorb even a TDOA which exceeds one super frame duration. Further, as shown in FIG. 29B, a TDOA within one super frame duration can, of course, also be reliably absorbed.

However, as long as the header information allows for generating a timing signal of a longer duration than a super frame (which is a minimum unit of combination), it is not limited to the index number of the super frame.

Figure 30:
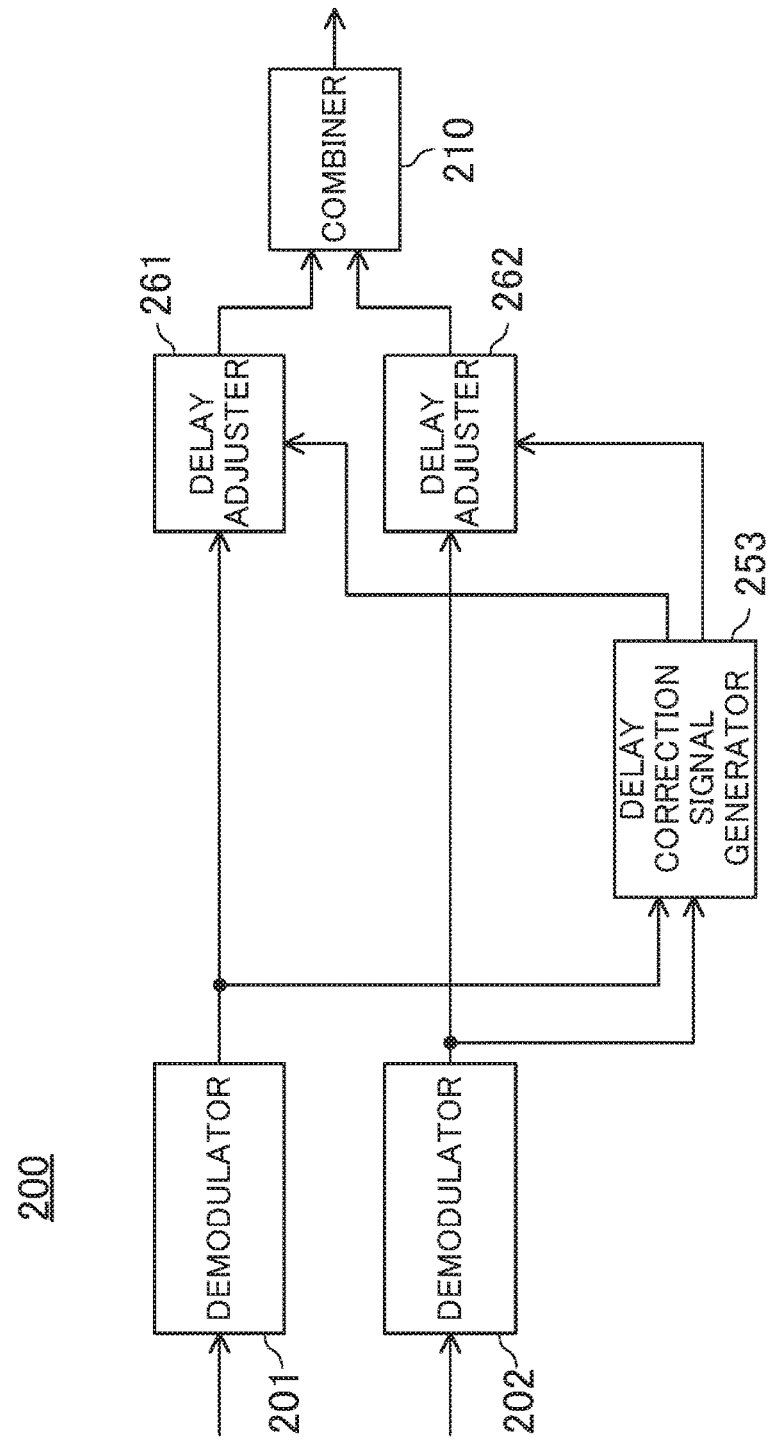
FIG. 30 is a block diagram showing a variation of the receiving system shown in FIG. 28.

FIG. 30 is a block diagram showing a variation of the receiving system shown in FIG. 28. The receiver 200 of the receiving system shown in FIG. 30 includes the demodulators 201, 202, one delay correction signal generator 253, the delay adjusters 261, 262, and one combiner 210. The delay correction signal generator 253 uses outputs from the demodulators 201, 202 to generate delay correction signals for the outputs from the demodulators 201, 202. Based on the delay correction signals, the delay adjusters 261, 262 delay the outputs from the demodulators 201, 202 and output post-delay-adjustment signals. The combiner 210 generates at least one stream based on the post-delay-adjustment signals. Furthermore, in the delay correction signal generator 253, a delay difference between data output by the demodulators 201, 202 is determined, and a delay correction signal is only generated if the delay difference is smaller than a predetermined delay duration (half of one super frame duration). That is, in the receiver 200 it is assumed that the delay difference lies within one super frame duration, and TDOA absorption is performed after having defined pairs of beginnings of super frames conforming to this condition as pairs which need to be time-adjusted.

Figure 31:
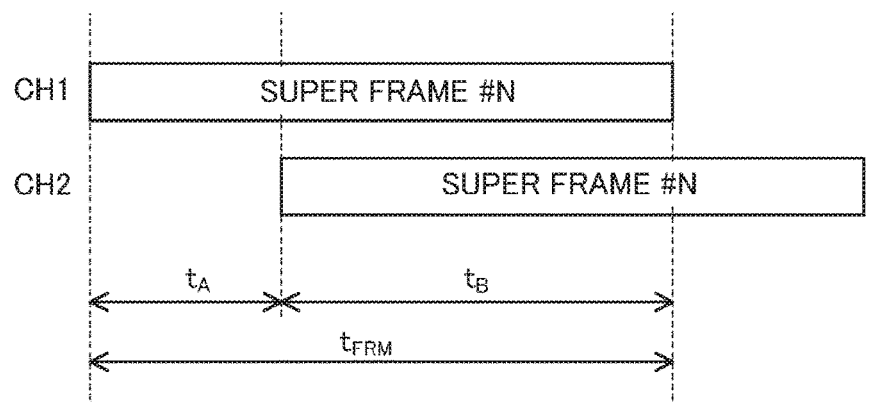
FIG. 31 is a timing diagram for explaining how the receiving system shown in FIG. 30 operates.

FIG. 31 is a timing diagram for explaining how the receiving system shown in FIG. 30 operates. Here, N is an arbitrary natural number, one super frame duration is $t_{FRM}$, a delay difference between an Nth super frame of channel 1 and an Nth super frame of channel 2 is $t_A$, and is a delay difference between the Nth super frame of channel 2 and an (N+1)th super frame of channel 1 is $t_B$. Since $t_{FRM}=t_A+t_B$, the equation $t_A \leq t_{FRM}/2$ holds true when $t_A \leq t_B$. Consequently, the delay correction signal generator 253 performs data processing based on the assumption that among the two values $t_A$ and $t_B$ determined as delay differences between two channels the smaller value is the correct delay difference.

According to the configuration shown in FIG. 30, a TDOA within half of one super frame duration can be absorbed with a reliability of 100 percent.

Now, when interpreting a time-sequence relation between outputs from the demodulators 201, 202, the delay correction signal generator 253 shown in FIG. 30 may interpret a combination of divided data based on an index (e.g., CC (continuity counter) values within a TS packet header) indicating data continuity.

Figure 32:
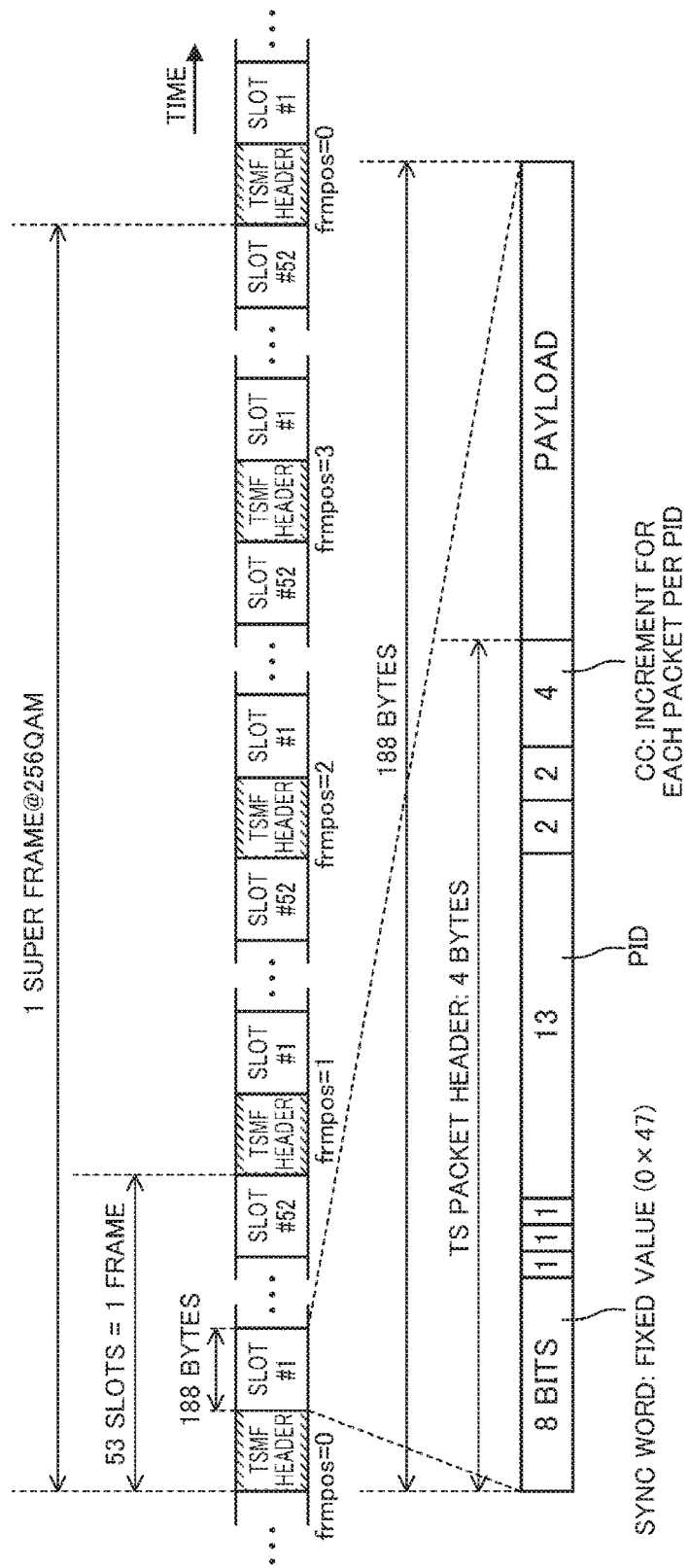
FIG. 32 is a timing diagram showing an example configuration of received data of the receiving system shown in FIG. 30.

FIG. 32 is a timing diagram showing an example configuration of received data of the receiving system shown in FIG. 30. The TS packet header includes a 4-bit CC incremented for each packet by the respective PID.

Figure 33:
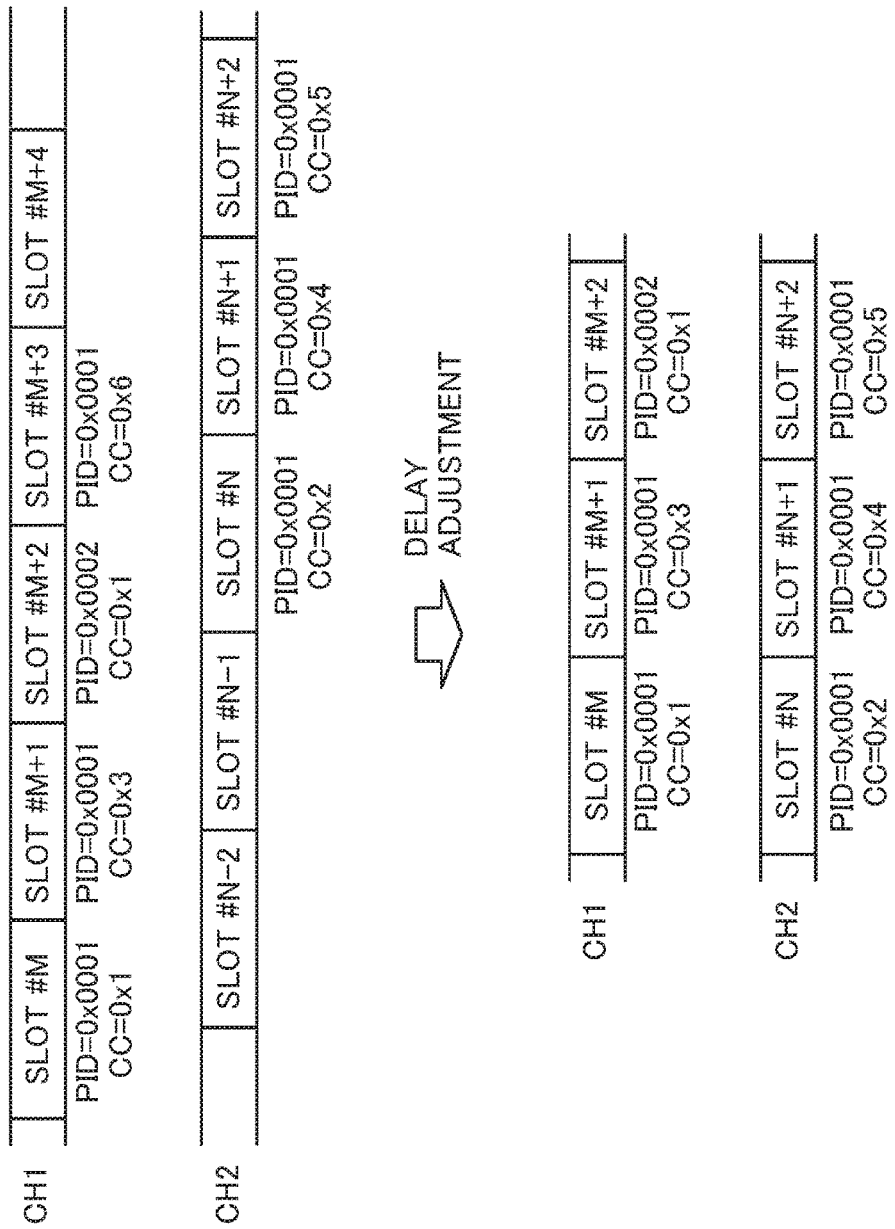
FIG. 33 is a timing diagram for explaining how the receiving system shown in FIG. 30 alternatively operates.

FIG. 33 is a timing diagram for explaining how the receiving system shown in FIG. 30 operates using CCs. In the example shown in FIG. 33, a slot #M of channel 1 with CC=1 and a slot #N of channel 2 with CC=2 have the same PID. Thus, the continuity of the CCs can be verified. Further, a slot #M+1 of channel 1 with CC=3 and a slot #N+1 of channel 2 with CC=4 have the same PID. Thus, the continuity of the CCs can be verified. However, a slot #M+2 of channel 1 with CC=1 and a slot #N+2 of channel 2 with CC=5 have different PIDs. Thus, the continuity of the CCs cannot be verified. TDOA absorption can be implemented by implementing delay adjustment based on at least one pair of the first two among the above-mentioned three pairs of slots.

Note that, when rearranging and combining data output by the demodulators 201 to 204, the combiner 210 shown in FIG. 1 performs rearrangement and combination based on header information obtained from the output of the demodulators 201 to 204, and on information used for interpreting the header information and stored within an updateable storage (register) in the combiner 210. As a result, the combination order can be arbitrarily set in the register. Here, available information of a carrier sequence is information for identifying a carrier, e.g., 8-bit information obtained from outputs resulting from demodulation of a plurality of carriers at the receiver 200 and which is included in the header information of an extension. The combination order may be determined by the size of the information of the carrier sequence. Alternatively, information which converts the information of the carrier sequence into the order may be stored in the register, and the combination order may be determined based on the information of the carrier sequence and the information in the register. Note that the method for determining the combination order may be shared in advance by the sending side and the receiving side.

Further, the combiner 210 shown in FIG. 1 rearranges and combines data output by the demodulators 201 to 204 based on an index (e.g., CC values within a TS packet header) indicating data continuity. The combiner 210 verifies a CC, and automatically discriminates the combination order.

FIG. 34 is a timing diagram for explaining how the receiving system shown in FIG. 1 operates using CCs. In the example shown in FIG. 34, in the first slot (#X−1, #Y−1, #Z−1, #W−1) of each of the channels, only the PID of channel 2 is different, which is why the continuity of the CCs cannot be verified and the combination order cannot be discriminated. However, in the following slots (#X, #Y, #Z, #W) of each of the channels, the PIDs of all of the channels are the same, which is why the continuity of the CCs can be verified. As a result, it is discriminated that the order of carriers goes channel 3, channel 1, channel 4, and channel 2.

Fourth Embodiment

Figure 35:
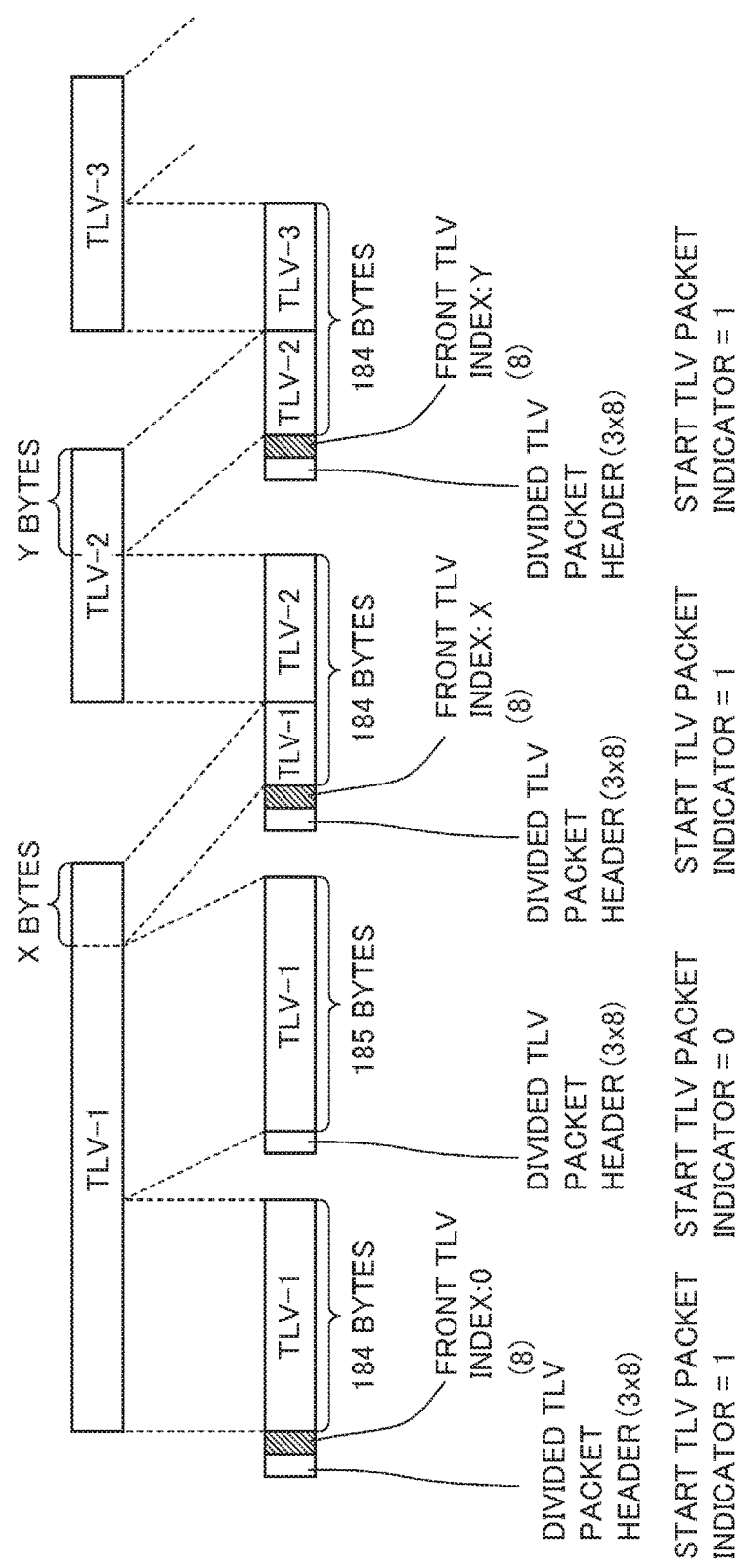
FIG. 35 is a timing diagram showing an example data configuration in a transmitting and receiving system according to a fourth embodiment.

FIG. 35 is a timing diagram showing an example data configuration in a transmitting and receiving system according to a fourth embodiment. Here, data are sent and received after a VL TVL (types length value) packet has been converted into a transmission packet of a fixed length.

The transmission packet has a fixed length of 188 bytes. The first three bytes constitute a header (i.e., a divided TLV packet header), while the following 185 bytes constitute a payload. A TLV packet start indicator in the divided TLV packet header being "1" indicates that a beginning of the TLV packet is included in the payload of the divided TLV packet. The first byte of the payload used when the TLV packet start indicator is "1" is defined as a beginning TLV index. A value of the beginning TLV index indicates at which byte of the payload the beginning of the TLV packet is located. When the TLV packet start indicator is "0," the beginning TLV index is not inserted into the payload.

In the scope of a data allocation method which, as described above, includes (i) dividing data of the TLV packet, (ii) inserting beginning position information (the beginning TLV index) indicating a start position of a VL packet 2 which is allocated next in a case where, in allocating into a transmission packet of a fixed length, allocation of a packet 1 which is a VL packet has been finished somewhere along the transmission packet, and (iii) subsequently allocating the packet 2, a case may occur where allocation of the packet 2 cannot be performed if the beginning position information (the beginning TLV index) indicating the start position of the VL packet 2 which is allocated next is inserted after the allocation of the packet 1 has been finished somewhere along the transmission packet. Exception handling in such a case will be described in the scope of the fourth embodiment.

Figure 36:
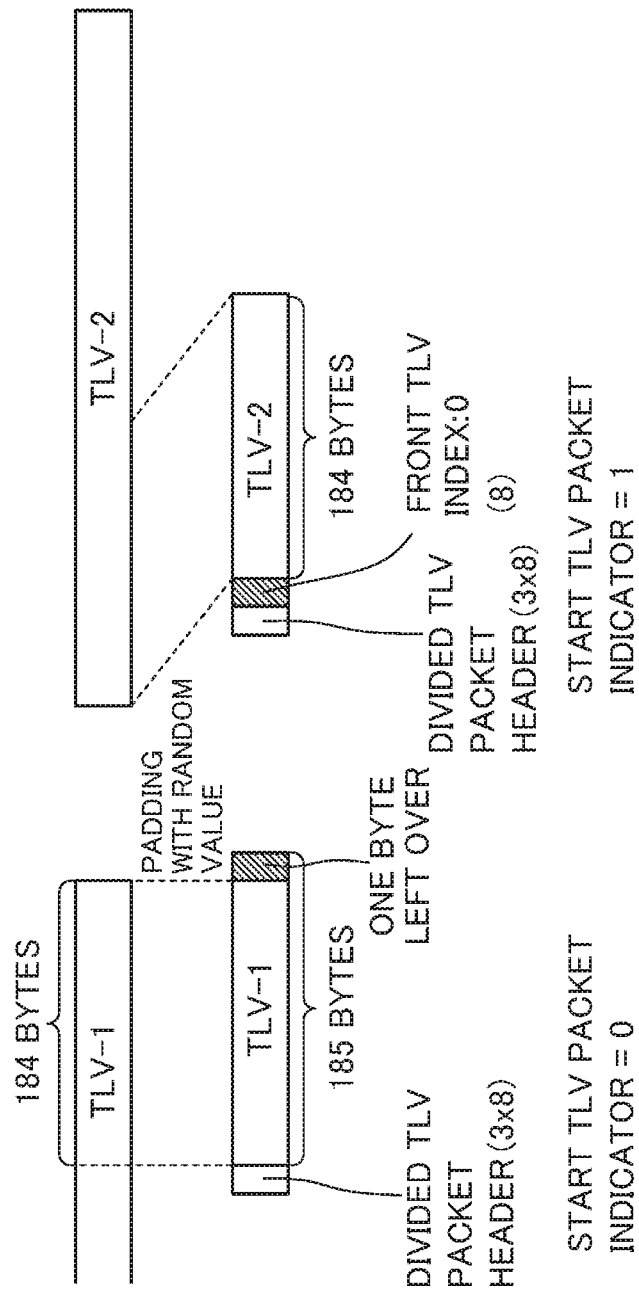
FIG. 36 is a timing diagram showing a first exception handling in the data configuration shown in FIG. 35.

FIG. 36 is a timing diagram showing a first exception handling of the data configuration shown in FIG. 35. In the scope of the data allocation method of the transmitter 100 involving the first exception handling, in a case where allocation of the packet 2 cannot be performed if the beginning position information (the beginning TLV index) indicating the start position of the packet 2 which is allocated next is inserted after allocation of the packet 1 has been finished somewhere along the transmission packet, invalid data are inserted instead of the beginning position information (beginning TLV index). That is, the one byte left over is padded with a random value. As a result, the beginning TLV index enters the following transmission packet.

In the scope of a data acquisition method of the receiver 200 corresponding to such a data allocation method of the transmitter 100, in a case where acquisition of data forming a VL packet 1 has been finished within a transmission packet 1 of a fixed length such that the VL TLV packet allocated to a transmission packet of a fixed length is acquired, and where the beginning position information (the beginning TLV index) indicating the start position of the following VL packet 2 is not inserted into the transmission packet 1 of the fixed length, data other than data forming the VL packet 1 within the transmission packet 1 of the fixed length are treated as invalid data.

Figure 37:
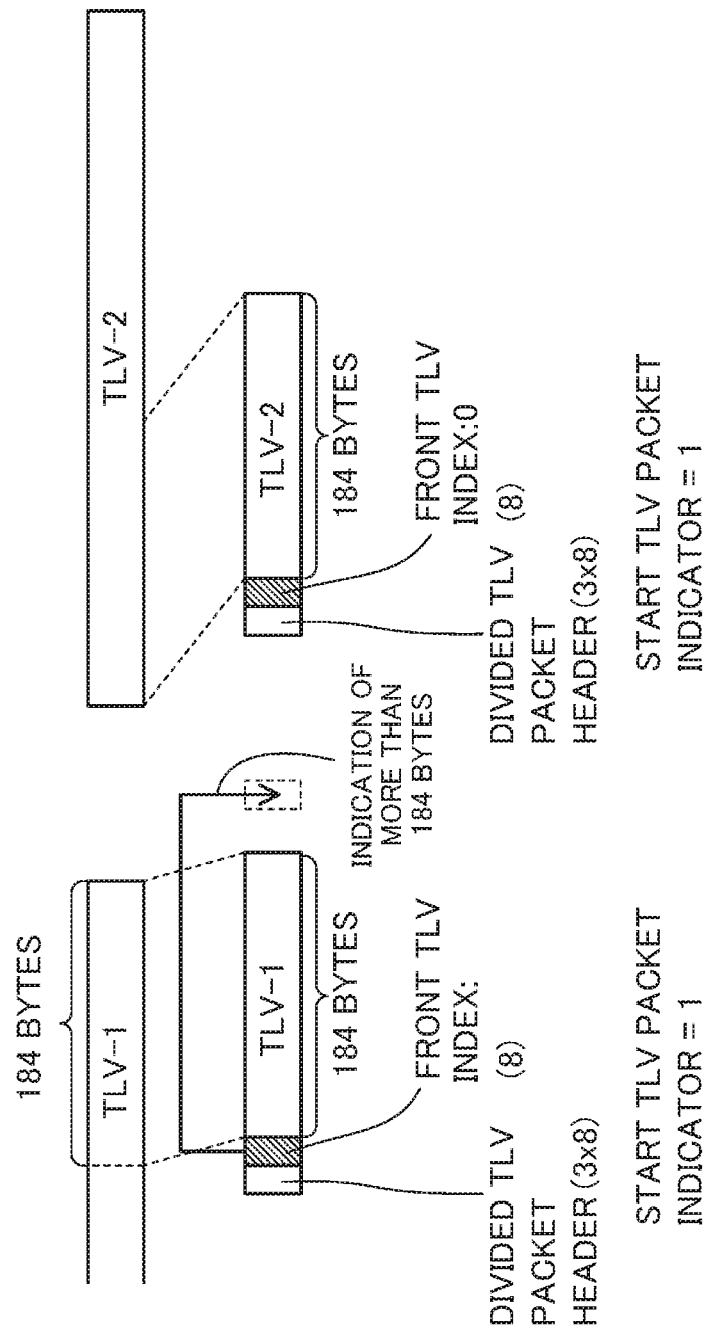
FIG. 37 is a timing diagram showing a second exception handling in the data configuration shown in FIG. 35.

FIG. 37 is a timing diagram showing a second exception handling of the data configuration shown in FIG. 35. In the scope of a data allocation method of the transmitter 100 involving the second exception handling, in a case where allocation of the packet 2 cannot be performed if the beginning position information (beginning TLV index) indicating the start position of the packet 2 which is allocated next is inserted after allocation of the packet 1 has been finished somewhere along the transmission packet 1, an invalid value is assigned instead of the beginning position information (beginning TLV index). That is, the beginning TLV index appoints a field of more than 184 bytes which does not exist in reality.

In the scope of a data acquisition method of the receiver 200 corresponding to such a data allocation method of the transmitter 100, processing is performed based on the assumption that, in a case where acquisition of data forming the VL packet 1 has been finished within the transmission packet 1 of the fixed length such that the VL TLV packet which is allocated to a transmission packet of a fixed length is acquired, and where within the transmission packet 1 of the fixed length an invalid value is assigned as the beginning position information (beginning TLV index) to the beginning position information (the beginning TLV index) indicating the start position of the following VL packet 2, no data forming the VL packet 2 are present within the transmission packet 1 of the fixed length.

Figure 38:
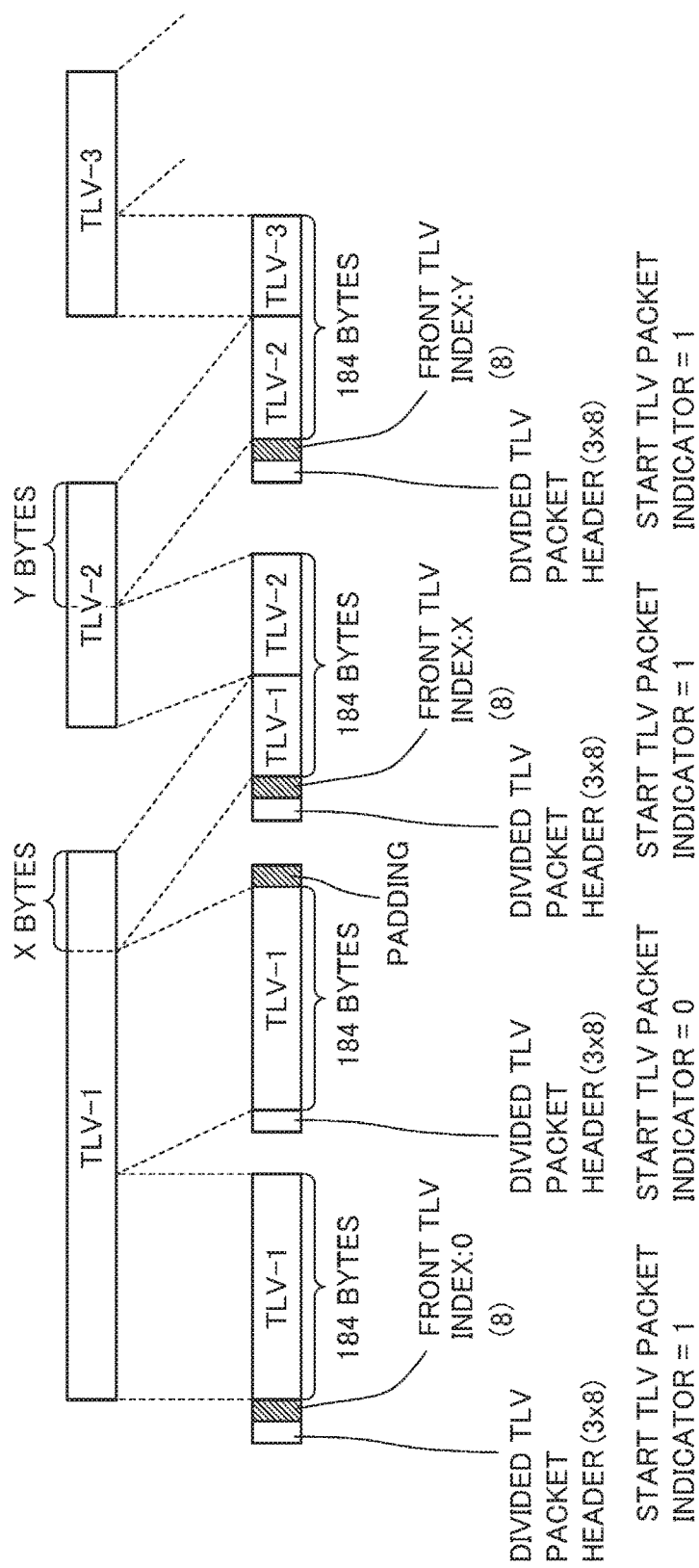
FIG. 38 is a timing diagram showing a third exception handling in the data configuration shown in FIG. 35.

FIG. 38 is a timing diagram showing a third exception handling of the data configuration shown in FIG. 35. According to a data allocation method of the transmitter 100 involving the third exception handling, the beginning position information (beginning TLV index) is inserted when the beginning of the VL TLV packet is included in a transmission packet, and invalid data are inserted instead of the beginning position information (beginning TLV index) when the beginning of the VL TLV packet is not included in the transmission packet. That is, when the TLV packet start indicator is "0," one byte at an arbitrary location is padded such that an actual payload length becomes 184 bytes.

In the scope of a data acquisition method of the receiver 200 corresponding to such a data allocation method of the transmitter 100, processing is performed based on the assumption that, in a case where the beginning position information (beginning TLV index) indicating a start position 2 of the following VL packet 2 is not included in the transmission packet 1 of the fixed length when an acquisition process of the VL packet 1 is performed such that the VL TLV packet allocated to a transmission packet of a fixed length is acquired, other than data forming the VL packet 1, invalid data are included in the transmission packet 1 of the fixed length.

Figure 39:
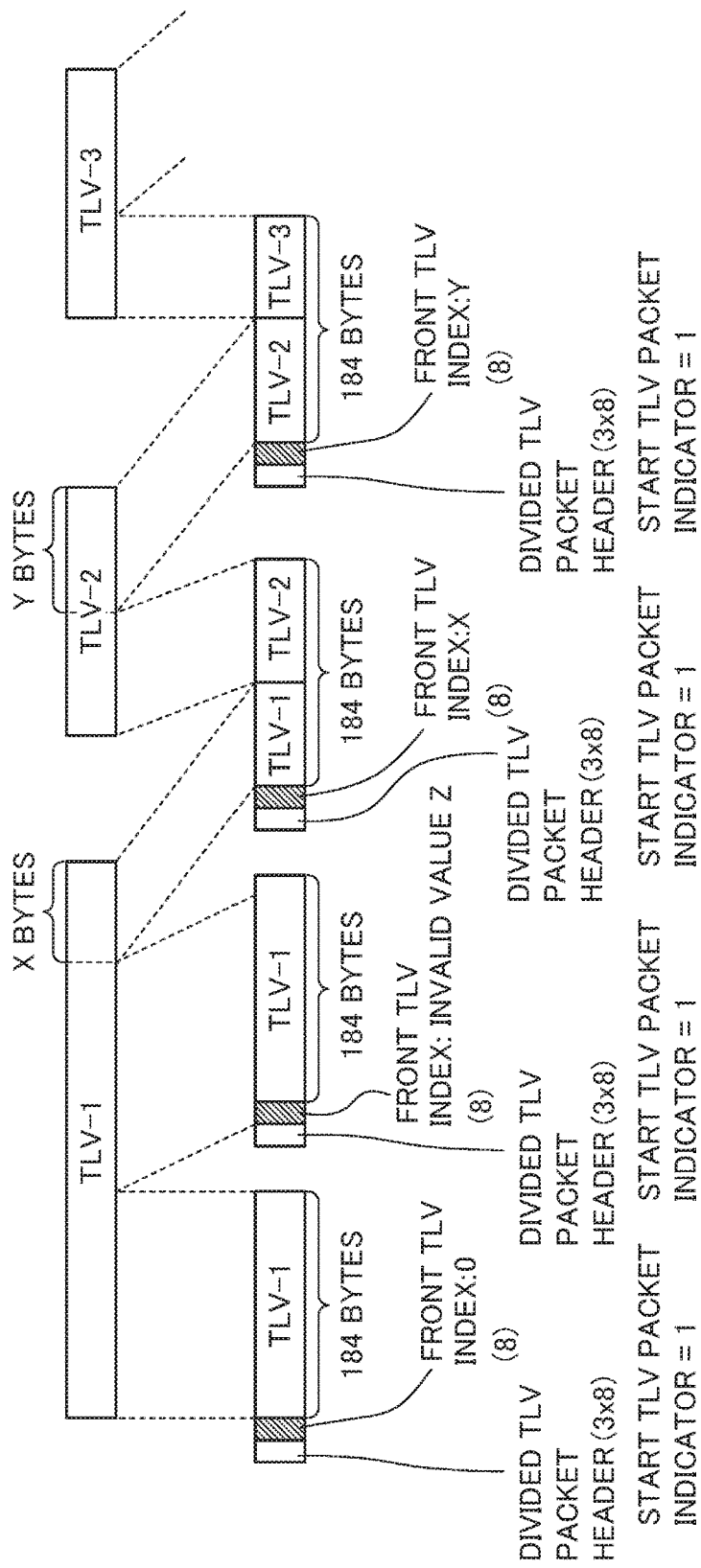
FIG. 39 is a timing diagram showing a fourth exception handling in the data configuration shown in FIG. 35.

FIG. 39 is a timing diagram showing a fourth exception handling in the data configuration shown in FIG. 35. According to a data allocation method of the transmitter 100 involving the fourth exception handling, a value indicating the start position of the packet 2 which is allocated next is assigned to the beginning position information (beginning TLV index) when the beginning of the VL TLV packet is included in the transmission packet, and an invalid value is assigned to the beginning position information (beginning TLV index) when the beginning of the VL TLV packet is not included in the transmission packet. That is, the payload length of the divided TLV packet is fixed as 184 bytes, and the beginning TLV index is continuously inserted. In a case where the beginning of the TLV packet is not included in the transmission packet, an invalid pointer position (e.g., an invalid value Z) is assigned to the beginning TLV index.

In the scope of a data acquisition method of the receiver 200 corresponding to such a data allocation method of the transmitter 100, processing is performed based on the assumption that, in a case where within the transmission packet 1 of the fixed length an invalid value is assigned as the beginning position information (the beginning TLV index) to the beginning position information (the beginning TLV index) indicating the start position 2 of the following VL packet 2 when an acquisition process of the VL packet 1 is performed such that the VL TLV packet allocated to a transmission packet of a fixed length is acquired, all data allocated with data forming the VL packet within the transmission packet 1 of the fixed length are data forming the VL packet 1.

In the scope of the data allocation method of the transmitter 100 involving the fourth exception handling shown in FIG. 39, a beginning TLV index area is held in the payload separately from the divided TLV packet header. Taking into consideration the processing taking place in the receiver 200, however, by allocating the beginning TLV index area present within the payload within the divided TLV packet header, alternatively both the TLV packet start indicator and the beginning TLV index area may be present within the divided TLV packet header. In particular, allocating the beginning TLV index area at the beginning of the divided TLV packet header has the effect that, in processing taking place in the receiver 200 or the back-end processor 300, latency between data reception and processing end becomes shorter. In these cases, the divided TLV packet header may be assumed to be four bytes, and the divided TLV packet header may be maintained as three bytes by deleting the one byte left over from a portion other than the TLV packet start indicator and the beginning TLV index area.

Furthermore, the above-described data allocation may be performed only between the receiver 200 and the back-end processor 300. More specifically, the receiver 200 may perform processing in the scope of which, after reconfiguration of a VL data sequence from a data sequence of a fixed length, both the TLV packet start indicator and the beginning TLV index area are allocated within the divided TLV packet header, and, in particular, the beginning TLV index area is allocated at the beginning of the divided TLV packet header.

Other Embodiments

In the foregoing description, first to fourth embodiments serve as examples of the technique disclosed in the present application. However, the technique according to the present disclosure is not limited to these embodiments, and is also applicable to embodiments where modifications, substitutions, additions, omissions, or sequential alterations are made appropriately. Moreover, each of the elements described in the embodiments may be combined, and defined as a new embodiment.

For example, as long as it is a system in which the transmitter 100 and the receiver 200 can share information generated by data combination of a stream divided into a plurality of carriers, the system is not limited to TSMF. Further, the modulation mode is not limited to QAM. The form of the stream is not limited to a TS packet or a TLV packet. The number of carriers is not limited to 4 or 2.

Moreover, the input of each of the demodulators 201 to 204 is not limited to an IF (intermediate frequency) signal, but may be an RF (radio frequency) signal, or may be data after AD (analog-to-digital) conversion. Each of the demodulators 201 to 204 may output a plurality of streams in the form of TS packets. Information passed from the add-on 211 to the demodulators 201 to 204 is not limited to delay correction values and timing signals.

Furthermore, the data transmission line is not limited to the CATV transmission line 150 shown in FIG. 1. The data transmitted are not limited to visual and audio data. A transmission system in which a stream exceeding the transmission capacity of one carrier is divided into a plurality of carriers is not limited to multiple carrier transmission. The modulation format is not limited to 64-QAM and 256-QAM. The packet configuration is not limited to the configuration described.

Finally, in the scope of the first embodiment, an example is described where the add-on 211 is added to an existing system having a function for simultaneous recording of a plurality of channels. However, as long as it is a system which can simultaneously receive a plurality of different channels, the present disclosure is not limited to this embodiment.

As can be seen from the above description, the transmitting and receiving system according to the present disclosure is useful for a transmitting and receiving system employing multiple carrier transmission.

What is claimed is:

1. A receiving system receiving a plurality of carriers and generating one or a plurality of streams, the system comprising:
    a first demodulator receiving and processing a first transmission signal;
    a second demodulator receiving and processing a second transmission signal different from the first transmission signal;
    a combiner generating one stream based on at least an output of the first demodulator and an output of the second demodulator;
    a selector receiving an output from the first demodulator and the one stream from the combiner as inputs, and selecting and outputting one among the output from the first demodulator and the one stream from the combiner; and
    a back-end processor receiving an output from the selector and an output from the second demodulator as inputs, and generating an output for a display, wherein
    the selector selects the output from the first demodulator in a receiving mode in single channel transmission, and selects the one stream in a receiving mode in multiple channel transmission.

2. The receiving system of claim 1, wherein the first demodulator, the second demodulator, the combiner, the selector, and the back-end processor are implemented with one LSI.

3. The receiving system of claim 1, wherein the combiner, the selector, and the back-end processor are implemented with one LSI.

4. The receiving system of claim 1, wherein the combiner and the selector are implemented with one LSI.

5. The receiving system of claim 1, wherein the back-end processor processes an output from the selector and the output from the second demodulator separately in the receiving mode in single channel transmission, and processes the output from the selector while not processing the output from the second demodulator in the receiving mode in multiple channel transmission.

6. The receiving system of claim 1, wherein the back-end processor determines whether the receiving mode in single channel transmission or the receiving mode in multiple channel transmission is selected.

7. A receiving system receiving a plurality of carriers and generating one stream, the system comprising:
    a first demodulator receiving and processing a first transmission signal;
    a second demodulator receiving and processing a second transmission signal different from the first transmission signal; and
    a combiner generating one stream based on at least an output from the first demodulator and an output from the second demodulator, wherein
    in the combiner, rearrangement and combination of data output by the first demodulator and of data output by the second demodulator are performed based on header information obtained from the first and second demodulators, and first identification data and second identification data which are respectively bound to target data to be rearranged,
    the second identification data indicate order of arrangement in a group of data, of the first identification data, having an identical value, and
    the header information includes information for specifying each carrier of the plurality of carriers.

8. The receiving system of claim 7, wherein the rearrangement and combination is performed based on the first identification data, the second identification data and a predetermined data corresponding to the second identification data which are defined as information inside an updateable storage in the combiner.

9. The receiving system of claim 7, wherein
    the stream comprises a plurality of packets in which indices indicating continuity of data in the packets are present,
    the second identification data are the indices indicating the continuity of data.

10. A receiving system receiving a plurality of carriers and generating one stream, the system comprising:
    a first demodulator receiving and processing a first transmission signal;
    a second demodulator receiving and processing a second transmission signal different from the first transmission signal; and
    a combiner generating one stream based on at least an output from the first demodulator and an output from the second demodulator, wherein
    in the combiner, rearrangement and combination of data output by the first demodulator and of data output by the second demodulator are performed based on header information obtained from the first and second demodulators, and the header information includes information for specifying each carrier of the plurality of carriers.

11. The receiving system of claim 10, wherein the information for identifying the plurality of carriers is 8-bit information.

12. The receiving system of claim 11, wherein the 8-bit information is included in header information of an extension.

13. A receiving system according to claim 10, wherein the first demodulator and the second demodulator perform different demodulation techniques, and each of the first demodulator and the second demodulator receives a signal in a different modulation, and demodulates the signal.

14. A receiving system according to claim 7, wherein the first demodulator and the second demodulator perform different demodulation techniques, and each of the first demodulator and the second demodulator receives a signal in a different modulation, and demodulates the signal.

* * * * *